(12) United States Patent
Ike

(10) Patent No.: US 11,338,799 B2
(45) Date of Patent: May 24, 2022

(54) DRIVING SUPPORT APPARATUS

(71) Applicant: TOYOTA JIDOSHA KABUSHIKI KAISHA, Toyota (JP)

(72) Inventor: Wataru Ike, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 215 days.

(21) Appl. No.: 16/379,030

(22) Filed: Apr. 9, 2019

(65) Prior Publication Data
US 2019/0315347 A1 Oct. 17, 2019

(30) Foreign Application Priority Data

Apr. 16, 2018 (JP) .............................. JP2018-078133

(51) Int. Cl.
*B60W 30/09* (2012.01)
*B60T 7/04* (2006.01)
(Continued)

(52) U.S. Cl.
CPC .............. *B60W 30/09* (2013.01); *B60T 7/042* (2013.01); *B60T 7/22* (2013.01); *B60T 2201/022* (2013.01);
(Continued)

(58) Field of Classification Search
CPC ............... B60W 30/09; B60W 30/085; B60W 30/0956; B60W 2420/42; B60W 2420/52;
(Continued)

(56) References Cited

U.S. PATENT DOCUMENTS 9,701,307 B1 7/2017 Newman et al.
2003/0233187 A1 12/2003 Egami
(Continued)

FOREIGN PATENT DOCUMENTS

CN 101223048 A 7/2008
CN 104755344 A 7/2015
(Continued)

OTHER PUBLICATIONS

Extended European Search Report dated Sep. 20, 2019 issued by the European Patent Office in counterpart application No. 19163853.5.
(Continued)

*Primary Examiner* — Nga X Nguyen
(74) *Attorney, Agent, or Firm* — Sughrue Mion, PLLC

(57) ABSTRACT

A driving support apparatus (10) executes collision prevention control for avoiding collision with the object when a possibility of a vehicle (VA) colliding with an object based on object information (e.g., distance, direction, and relative speed) acquired by a millimeter wave radar device (21) and a camera device (22) is high. Further, the driving support apparatus does not execute the collision prevention control when an accelerator pedal operation amount is equal to or larger than a stop threshold value. However, the driving support apparatus executes the collision prevention control even when the accelerator pedal operation amount is equal to or larger than the stop threshold value within a specific period of from a start point at which a predetermined erroneous operation condition is satisfied, to an end point, which is a time point after a predetermined consideration period has elapsed since the erroneous operation condition has no longer been satisfied.

7 Claims, 11 Drawing Sheets

(51) Int. Cl.
   *B60T 7/22*     (2006.01)
   *B60W 30/085*   (2012.01)
   *B60W 30/095*   (2012.01)

(52) U.S. Cl.
   CPC ........ *B60T 2201/03* (2013.01); *B60W 30/085* (2013.01); *B60W 30/0956* (2013.01); *B60W 2420/42* (2013.01); *B60W 2420/52* (2013.01)

(58) Field of Classification Search
   CPC ... B60W 2554/4029; B60W 2554/402; B60W 2540/12; B60W 2554/00; B60W 2540/10; B60W 30/08; B60T 7/042; B60T 7/22; B60T 2201/022; B60T 2201/03
   See application file for complete search history.

(56) References Cited

U.S. PATENT DOCUMENTS

| | | | |
|---|---|---|---|
| 2009/0037055 A1* | 2/2009 | Danner | B60R 21/0134 701/45 |
| 2010/0134263 A1 | 6/2010 | Mathony et al. | |
| 2012/0191313 A1 | 7/2012 | Miyahara | |
| 2012/0283895 A1 | 11/2012 | Noda | |
| 2013/0041564 A1* | 2/2013 | Doi | B60W 50/087 701/70 |
| 2014/0025267 A1* | 1/2014 | Tezuka | B60W 30/18027 701/51 |
| 2015/0046054 A1 | 2/2015 | Takahashi et al. | |
| 2015/0274179 A1 | 10/2015 | Inoue et al. | |
| 2015/0307091 A1 | 10/2015 | Gokan et al. | |
| 2016/0001275 A1 | 1/2016 | Goto et al. | |
| 2016/0194000 A1* | 7/2016 | Taki | B60W 30/08 701/70 |
| 2016/0244036 A1 | 8/2016 | Ike | |
| 2016/0280190 A1 | 9/2016 | Franz | |
| 2017/0106839 A1 | 4/2017 | Uechi | |
| 2017/0341612 A1 | 11/2017 | Ohmori et al. | |
| 2018/0043885 A1 | 2/2018 | Harada et al. | |
| 2019/0009775 A1 | 1/2019 | Ito et al. | |
| 2019/0092343 A1 | 3/2019 | Hoshikawa et al. | |

FOREIGN PATENT DOCUMENTS

| | | | | |
|---|---|---|---|---|
| CN | 105745111 B | * | 1/2019 | ............ B60W 50/14 |
| DE | 10 2011 121 728 A1 | | 6/2013 | |
| DE | 10 2013 225 483 A1 | | 6/2015 | |
| EP | 2927082 A1 | | 10/2015 | |
| JP | 11-278092 A | | 10/1999 | |
| JP | 2004-17847 A | | 1/2004 | |
| JP | 2008-20950 A | | 1/2008 | |
| JP | 2010-282350 A | | 12/2010 | |
| JP | 2012-121534 A | | 6/2012 | |
| JP | 2012-229722 A | | 11/2012 | |
| JP | 2012-234407 A | | 11/2012 | |
| JP | 2013-129228 A | | 7/2013 | |
| JP | 2014-093040 A | | 5/2014 | |
| JP | 2015-036270 A | | 2/2015 | |
| JP | 2005-082041 A | | 3/2015 | |
| JP | 2015-081075 A | | 4/2015 | |
| JP | 5846316 B2 | | 1/2016 | |
| JP | 2016-78677 A | | 5/2016 | |
| JP | 2016-101891 A | | 6/2016 | |
| JP | 5938515 B2 | | 6/2016 | |
| JP | 5938518 B2 | | 6/2016 | |
| JP | 2017-074909 A | | 4/2017 | |
| WO | 2008/007202 A1 | | 1/2008 | |
| WO | WO-2008015551 A2 | * | 2/2008 | ............ B60W 40/08 |
| WO | 2014/083787 A1 | | 6/2014 | |
| WO | 2016/059753 A1 | | 4/2016 | |

OTHER PUBLICATIONS

Office Action for U.S. Appl. No. 16/041,092 dated Apr. 14, 2021.
Office Action for U.S. Appl. No. 16/041,092 dated Apr. 22, 2020.
Office Action for U.S. Appl. No. 16/041,092 dated Aug. 27, 2020.
Notice of Allowance for U.S. Appl. No. 16/041,092 dated Feb. 8, 2021.
Supplemental Notice of Allowability for U.S. Appl. No. 16/041,092 dated Mar. 8, 2021.
U.S. Appl. No. 16/041,092, filed Jul. 20, 2018.
Notice of Allowance dated Oct. 6, 2021, which issued during the prosecution of U.S. Appl. No. 16/041,092.

* cited by examiner

DRIVING SUPPORT APPARATUS

BACKGROUND

Technical Field

The present invention relates to a driving support apparatus configured to execute collision prevention control for avoiding collision with an object present in front of a vehicle when a predetermined collision condition indicating that the vehicle is likely to collide with the object is satisfied.

Related Art

Hitherto, there has been known a driving support apparatus configured to detect an object (obstacle) in front of a vehicle, and execute, on the vehicle, collision prevention control for preventing collision with the object when the vehicle is determined to be likely to collide with the detected object (determined to have a high collision possibility). Such collision prevention control includes, for example, automatic braking control for automatically applying a braking force to the vehicle, and warning control for issuing, to a driver, a warning to the effect that the vehicle is likely to collide with an object.

One of such related-art driving support apparatus (hereinafter referred to as "related-art device") determines that the driver has an intention to cancel (stop) collision prevention control and stops execution of the collision prevention control when an operation amount of an accelerator pedal is equal to or larger than a stop threshold value during execution of the collision prevention control (e.g., refer to Japanese Patent Application Laid-open No. 2017-74909).

Even when the operation amount of the accelerator pedal is equal to or larger than the stop threshold value under a "state (simultaneous depression state) in which both of the accelerator pedal and a brake pedal are operated", the related-art device does not stop and continues the collision prevention control because the driver cannot be determined to have an intention to cancel automatic braking.

That is, the related-art device stops automatic braking when the operation amount of the accelerator pedal is equal to or larger than the stop threshold value and the simultaneous depression state is not effective (that is, when only the accelerator pedal is strongly depressed).

SUMMARY

Meanwhile, when the driver is mistaking the accelerator pedal for the brake pedal and operating the accelerator pedal (when erroneous depression (erroneous operation) is performed), the driver is likely to be in a panicked state, and may take his or her foot off from the accelerator pedal and/or the brake pedal. When such an operation is performed, the above-mentioned simultaneous depression state is released. After that, when the driver has erroneously depressed only the accelerator pedal and the operation amount of the accelerator pedal becomes equal to or larger than the stop threshold value by the operation, the related-art device stops automatic braking although the automatic braking is required to be continued.

Further, in addition to the case of simultaneous depression, the above-mentioned erroneous operation often involves an operation of depressing the accelerator pedal again immediately after taking the foot off from the accelerator pedal. Thus, when the operation amount of the accelerator pedal has greatly decreased and then greatly increased within a predetermined period immediately before a current time point, it is preferred to be determined that an erroneous operation is being performed. Further, when such a determination that an erroneous operation is being performed is made, automatic braking is preferably continued even when the operation amount of the accelerator pedal is equal to or larger than the stop threshold value.

However, when the driver has continued to depress the accelerator pedal after depressing the accelerator pedal again, a large amount of decrease and increase of the operation amount of the accelerator pedal cannot be detected within the predetermined period immediately before the current time point, and thus determination of erroneous depression is canceled. As a result, when the operation amount of the accelerator pedal becomes equal to or larger than the stop threshold value, automatic braking is stopped although the automatic braking is required to be continued.

The present invention has been made in order to solve the above-mentioned problem. That is, the present invention has an object to provide a driving support apparatus capable of executing appropriate collision prevention control even when a driver has operated an accelerator pedal in a panicked state immediately after determination of an erroneous operation is canceled.

A driving support apparatus according to one embodiment of the present invention (hereinafter sometimes referred to as "device according to one embodiment of the present invention") includes: an object detector configured to detect an object present in front of a vehicle; an executor configured to execute collision prevention control for avoiding collision with the detected object when a predetermined collision condition indicating that the vehicle is likely to collide with the detected object is satisfied; and a prohibitor configured to prohibit the executor from executing the collision prevention control when an operation amount of an accelerator operator of the vehicle is equal to or larger than a predetermined stop threshold value.

Further, the prohibitor is configured to allow the executor to execute the collision prevention control even when the operation amount is equal to or larger than the stop threshold value within a specific period (time point t1 to time point t5) of from a start point to an end point. The start point is a time point of determination that a predetermined erroneous operation condition relating to the operation amount is satisfied. The predetermined erroneous operation condition is satisfied when a driver of the vehicle is likely to erroneously operate the accelerator operator. The end point is a time point of determination that a predetermined consideration period (Tminashi) has elapsed since the predetermined erroneous operation condition has no longer been satisfied.

DETAILED DESCRIPTION

Figure 1:
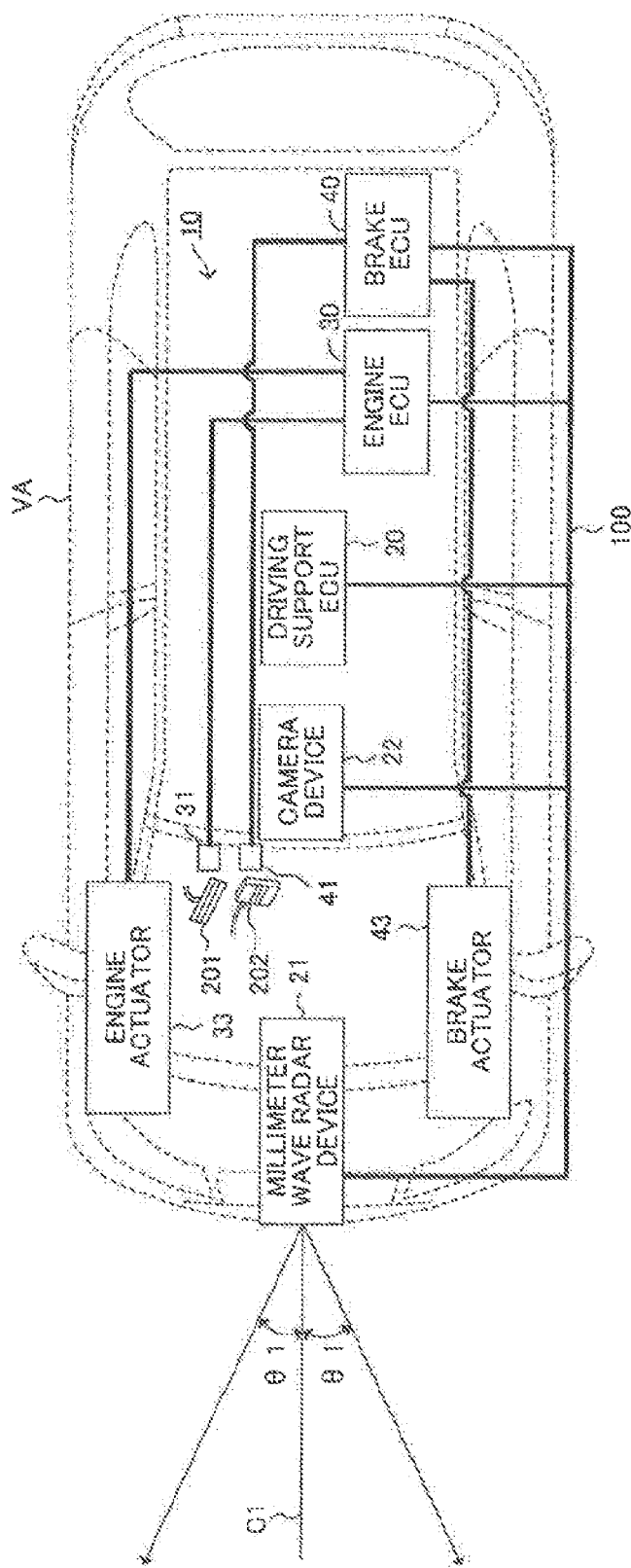
FIG. 1 is a schematic system configuration diagram for illustrating a driving support apparatus (first device) according to a first embodiment of the present invention.

A general overview of the present disclosure is being provided, followed by a more detailed description of the first and second embodiments. A driving support apparatus according to one embodiment of the present invention (hereinafter sometimes referred to as "device according to one embodiment of the present invention") includes: an object detector (21, 22) configured to detect an object present in front of a vehicle; an executor (20, 40, 43, Step 460) configured to execute collision prevention control for avoiding collision with the detected object when a predetermined collision condition indicating that the vehicle is likely to collide with the detected object is satisfied ("Yes" in Step 430); and a prohibitor (20, 40, Step 440, Step 450, Step 480, Step 520, Step 570, and Step 530) configured to prohibit the executor from executing the collision prevention control when an operation amount (AP) of an accelerator operator (201) of the vehicle is equal to or larger than a predetermined stop threshold value (APpcsth). See FIGS. 1-5.

Further, the prohibitor is configured to allow the executor to execute the collision prevention control (Step 450 and Step 960) even when the operation amount is equal to or larger than the stop threshold value within a specific period (time point t1 to time point t5) of from a start point ("Yes" in Step 720, Step 740, "Yes" in Step 815, and Step 825) to an end point ("Yes" in Step 930, and Step 960). The start point is a time point of determination that a predetermined erroneous operation condition relating to the operation amount is satisfied. The predetermined erroneous operation condition is satisfied when a driver of the vehicle is likely to erroneously operate the accelerator operator. The end point is a time point of determination that a predetermined consideration period (Tminashi) has elapsed since the predetermined erroneous operation condition has no longer been satisfied ("Yes" in Step 750 or "Yes" in Step 760, Step 780, "Yes" in Step 830, and Step 840). See FIGS. 8 and 9.

With this, even when the erroneous operation condition is no longer satisfied, the specific period continues from the time point at which the erroneous operation condition is no longer satisfied until the time point at which the consideration period Tminashi is determined to have elapsed, and the collision prevention control is executed irrespective of the operation amount, that is, even when the operation amount is equal to or larger than the stop threshold value.

Thus, even when a driver in a panicked state has operated the accelerator operator immediately after determination of an erroneous operation is canceled, the collision prevention control is reliably executed. Therefore, it is possible to reduce the possibility of the vehicle colliding with an object.

In one aspect of the present invention, the prohibitor is configured to determine satisfaction of the predetermined erroneous operation condition (Step 740) when the operation amount is larger than a first predetermined amount (APa) and an operation amount (BP) of a brake operator (202) of the vehicle is larger than a second predetermined amount (BPa) ("Yes in Step 720).

When the driver is operating the accelerator operator and the brake operator at the same time (performing so-called simultaneous depression), the driver is considered to be "in a panicked state and operating the accelerator operator in spite of an intention to apply a braking force to the vehicle". Thus, according to the above-mentioned aspect, it is possible to determine that an erroneous operation state has occurred when such an operation is performed.

In one aspect of the present invention, the prohibitor is configured to determine satisfaction of the predetermined erroneous operation condition (Step 825) when a reoperation condition is satisfied ("Yes" in Step 815, and Step 820). The reoperation condition is satisfied when a history of the operation amount in a predetermined period (Tnaoshi) immediately before a current time point indicates a reoperation state, in which the driver has performed an increase operation of increasing the operation amount after performing a decrease operation of decreasing the operation amount.

When the driver has performed the increase operation (an operation of increasing the depression force of the accelerator pedal) after performing the decrease operation (after performing an operation of decreasing the depression force of the accelerator pedal) within the predetermined period, the driver is considered to be performing so-called re-depression. When the driver is performing re-depression, the accelerator pedal is strongly operated within the predetermined period, and thus the driver is considered to be in a panicked state. Further, the driver may be "operating the accelerator operator in spite of the intention to apply a braking force to the vehicle". Thus, according to the above-mentioned aspect, it is possible to determine that an erroneous operation state has occurred when such an operation is performed.

In one aspect of the present invention, the prohibitor is configured to determine satisfaction of the reoperation condition (Step 820) when the operation amount at the current time point is equal to or larger than a third predetermined amount (APb) ("Yes" in Step 810) and the operation amount has decreased from the third predetermined amount or more to a fourth predetermined amount (APc) or less within the predetermined period (Step 815).

According to the above-mentioned aspect, the driver is determined to be performing re-depression when the history of the operation amount within the predetermined period immediately before the current time point satisfies the following two conditions.

The operation amount at the current time point is equal to or larger than the third predetermined amount.

The operation amount has decreased from the third predetermined amount or more to the fourth predetermined amount or less within the predetermined period immediately before the current time point.

Thus, when the driver has performed such a decrease operation as to change the operation amount from the value of the third predetermined amount or more to the fourth predetermined amount or less within the predetermined period, and after that, has performed such an increase operation as to change the operation amount from the value of the fourth predetermined amount or less to the third predetermined amount or more, the driver is determined to be performing re-depression. In other words, it is determined that the driver is performing re-depression when a sudden increase operation is performed after a sudden decrease operation within the predetermined period. Thus, when the driver is performing usual and gradual re-depression with a certain intention, the above-mentioned conditions are likely not to be satisfied, and it is possible to accurately determine that re-depression has been performed by an erroneous operation.

In one aspect of the present invention, the prohibitor is configured to cause the executor to execute the collision prevention control (Step 460, and "No" in Step 530) even when the operation amount is equal to or larger than the stop threshold value ("Yes" in Step 440 and "Yes" in Step 520) in a case where the detected object satisfying the predetermined collision condition is a pedestrian ("No" in Step 1010 and "No" in Step 1110).

The driver is unlikely to perform such an operation as to cause the operation amount to be equal to or larger than the stop threshold value when the vehicle is likely to collide with a pedestrian. When the driver is performing such an operation, the operation is likely to be an unintentional operation by the driver. According to this aspect, when the object satisfying the predetermined condition is a pedestrian, the collision prevention control is executed irrespective of whether or not the operation amount is equal to or larger than the stop threshold value or smaller than the stop threshold value. Thus, it is possible to reliably execute the collision prevention control even when such an operation is performed.

In one aspect of the present invention, the prohibitor is configured to cause the executor to execute the collision prevention control (Step 460, and "No" in Step 530) even when the operation amount is equal to or larger than the stop threshold value ("Yes" in Step 440 and "Yes" in Step 520) in a case where the detected object satisfying the predetermined collision condition is a two-wheeled vehicle including a bicycle and a motorcycle ("No" in Step 1010 and "No" in Step 1110).

As in the case of a pedestrian, the driver is unlikely to perform such an operation as to cause the operation amount to be equal to or larger than the stop threshold value when the vehicle is likely to collide with a two-wheeled vehicle. When the driver is performing such an operation, the operation is likely to be an unintentional operation by the driver. It is possible to reliably execute the collision prevention control even when the driver is performing an unintentional operation.

First Embodiment (Configuration)

As illustrated in FIG. 1, a driving support apparatus (hereinafter sometimes referred to as "first device") 10 according to a first embodiment of the present invention is mounted on a vehicle VA. The first device 10 includes a driving support ECU (hereinafter referred to as "DSECU") 20, an engine ECU 30, and a brake ECU 40. Those ECUs are capable of exchanging (communicating) data with one another via a communication/sensor controller area network (CAN) 100. The ECU is an abbreviation of an electronic control unit, and is an electronic control circuit including, as a principal component, a microcomputer including, for example, a CPU, a ROM, a RAM, and an interface. The CPU implements various functions described later by executing instructions (routines) stored in a memory (ROM). Those ECUs may be integrated into one ECU.

Figure 2:
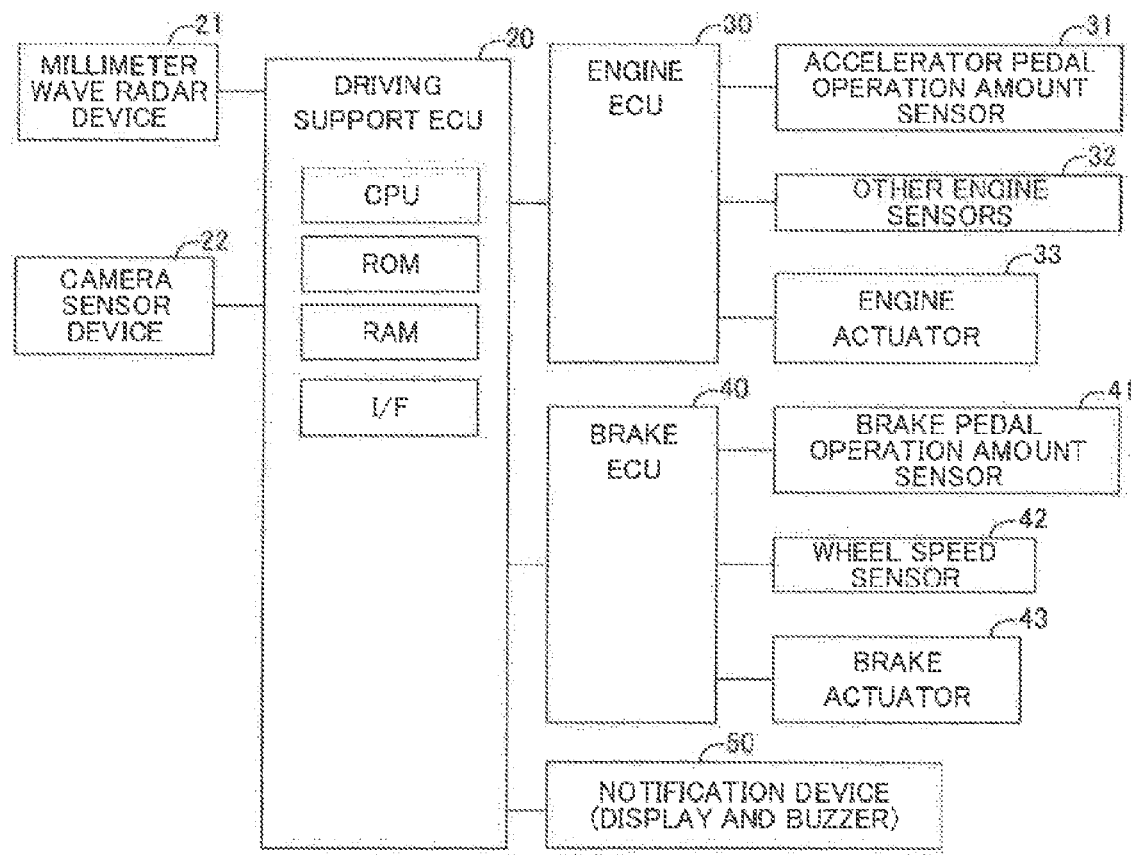
FIG. 2 is a detailed configuration diagram for illustrating the driving support apparatus illustrated in FIG. 1.

Further, the first device 10 includes a millimeter wave radar device 21 and a camera device 22. The millimeter wave radar device 21 and the camera device 22 are also capable of exchanging data with the driving support ECU 20 via the CAN 100. More specifically, as illustrated in FIG. 2, the driving support ECU 20 is connected to the millimeter wave radar device 21 and the camera device 22 in a communicable manner.

The millimeter wave radar device 21 includes a millimeter wave transmitter/receiver and a processor. As illustrated in FIG. 1, the millimeter wave radar device 21 is arranged at the front end of the vehicle VA at a central part in a vehicle-width direction. The millimeter wave transmitter/receiver emits a millimeter wave having a central axis Cl extending in a straight forward direction of the vehicle VA and propagating with a predetermined angle θ1 in left and right directions with respect to the central axis Cl. The millimeter wave is reflected by an object (e.g., other vehicles, pedestrians, and two-wheeled vehicles). The millimeter wave transmitter/receiver receives this reflected wave.

The processor of the millimeter wave radar device 21 acquires object information such as a distance to an object (obstacle), a relative speed of the object (a speed of the object with respect to the vehicle VA), and a direction of the object (an angle formed by the central axis Cl and a straight line passing through the position of the object and the arrangement position of the millimeter wave radar device 21) based on, for example, a phase difference between the transmitted millimeter wave and the received reflected wave, an attenuation level of the reflected wave, and a period of time from transmission of the millimeter wave until reception of the reflected wave.

As illustrated in FIG. 1, the camera device 22 is arranged at an upper part of a front windshield of a vehicle interior. The camera device 22 acquires an image in the straight forward direction of the vehicle VA, and acquires object information (e.g., the distance to an object and the direction of the object) from the image. The DSECU 20 corrects object information acquired by the millimeter wave radar device 21 based on the object information acquired by the camera device 22, to thereby acquire definitive object information to be used for collision determination described later.

As illustrated in FIG. 2, the engine ECU 30 is connected to an accelerator pedal operation amount sensor (accelerator opening degree sensor) 31 and a plurality of other engine sensors 32, and is configured to receive detection signals from those sensors.

The accelerator pedal operation amount sensor 31 detects an operation amount AP of an accelerator pedal (hereinafter sometimes referred to as "accelerator operator") 201 of the vehicle VA illustrated in FIG. 1. The accelerator pedal operation amount AP is "0" when the accelerator pedal 201 is not operated.

The plurality of other engine sensors 32 detect an operation state amount of an "internal combustion engine of a gasoline injection type and spark ignition type serving as a drive source of the vehicle VA" (not shown). The engine sensor 32 includes, for example, a throttle valve opening degree sensor, an engine rotation speed sensor, and an intake air amount sensor.

Further, the engine ECU 30 is connected to an engine actuator 33 such as a throttle valve actuator and a fuel injection valve. The engine ECU 30 changes a torque generated by the internal combustion engine by driving the engine actuator 33, and adjusts the driving force of the vehicle VA in this manner. The engine ECU 30 drives the throttle valve actuator so that the opening degree of the throttle valve matches a set target throttle valve opening degree TAtgt. The engine ECU 30 determines the target throttle valve opening degree TAtgt so that the target throttle valve opening degree TAtgt becomes larger as the accelerator pedal operation amount AP becomes larger at the time of normal operation.

The brake ECU 40 is connected to, for example, a brake pedal operation amount sensor 41 and a plurality of wheel speed sensors 42, and is configured to receive detection signals from those sensors.

The brake pedal operation amount sensor 41 detects an operation amount (pedal depression amount) BP of the brake pedal 202 of the vehicle VA illustrated in FIG. 1. The brake pedal operation amount BP is "0" when the brake pedal 202 is not operated. The brake pedal operation amount sensor 41 may include a stop lamp switch configured to change its state from an off state to an on state when the brake pedal 202 has started to be depressed. In this case, when the state of the stop lamp switch is the off state, the brake pedal operation amount BP is "0", whereas when the state of the stop lamp switch is the on state, the brake pedal operation amount BP takes a value larger than "0".

Each of the plurality of wheel speed sensors 42 outputs a pulse signal that depends on the rotation speed (wheel rotation speed) of each wheel. The brake ECU 40 detects the rotation speed of each wheel based on this pulse signal. Further, the brake ECU 40 acquires a vehicle speed (own vehicle speed) SPD of the vehicle VA based on the rotation speed of each wheel. The brake ECU 40 may be connected to a vehicle speed sensor configured to detect the rotation speed of a drive axis as the vehicle speed SPD.

Further, the brake ECU 40 is connected to a brake actuator 43. The brake actuator 43 is a hydraulic control actuator. The brake actuator 43 is arranged in a hydraulic circuit (not shown) provided between a master cylinder (not shown) for pressuring working fluid by a depressing force of the brake pedal and a frictional braking apparatus including a widely-known wheel cylinder provided in each wheel. The brake actuator 43 adjusts a hydraulic pressure of working fluid to be supplied to the wheel cylinder.

Further, the brake ECU 40 drives the brake actuator 43 based on the set definitive target deceleration to control the hydraulic pressure of working fluid to be supplied to the wheel cylinder. As a result, an adjusted breaking force (frictional breaking force) is generated in each wheel, and thus, the deceleration of the vehicle VA is caused to match the target deceleration. Herein, the deceleration indicates the magnitude of a negative acceleration. That is, as the negative acceleration becomes larger, the deceleration becomes larger. As described later, the brake ECU 40 receives a plurality of required decelerations calculated by the brake ECU 40 itself and the DSECU 20, and selects the largest required deceleration out of the plurality of required decelerations as the definitive target deceleration.

As illustrated in FIG. 2, the DSECU 20 is further connected to, for example, a notification device 50.

The notification device 50 includes a display device arranged in a range recognizable by a driver and a sound emitting device. The notification device 50 outputs display and sound in accordance with a command from the DSECU 20.

(Outline of Operation)

When the first device determines that an object (e.g., obstacle such as another vehicle) present in front of the vehicle VA and the vehicle VA are likely to collide with each other, the first device automatically applies a braking force to the vehicle VA. Such automatic braking (hereinafter sometimes referred to as "pre-crash safety braking" or "PCS automatic braking") itself is widely known, and is described in, for example, Japanese Patent Application Laid-open No. 2012-229722, Japanese Patent Application Laid-open No. 2005-82041, and Japanese Patent Application Laid-open No. 2015-36270.

When the accelerator pedal operation amount AP becomes equal to or larger than a predetermined automatic braking stop threshold value APpcsth during execution of the PCS automatic braking, the first device considers that the driver has an intention to avoid collision by an accelerator pedal operation, and stops (cancels) PCS automatic braking.

When a time point at which the accelerator pedal operation amount AP becomes equal to or larger than the predetermined automatic braking stop threshold value APpcsth during execution of PCS automatic braking falls within a predetermined specific period described later, the first device does not stop and continues PCS automatic braking. A start point (start time point) and end point (end time point) of this specific period are as follows.

Start point: Time point at which the first device determines occurrence of an erroneous operation state of the accelerator pedal (hereinafter also referred to as "erroneous operation determination start time point")

End point: Time point at which the first device determines elapse of a predetermined consideration period (Tminashi) from a time point (hereinafter also referred to as "erroneous operation determination end time point") at which the first device determines that the erroneous operation state of the accelerator pedal has no longer occurred When, for example, at least one of "a first erroneous operation condition or a second erroneous operation condition" described below is satisfied, the first device determines that the erroneous operation state of the accelerator pedal has occurred.

(First Erroneous Operation Condition)

The accelerator pedal operation amount AP is larger than a first predetermined amount APa, and the brake pedal operation amount BP is larger than a second predetermined amount BPa ("0" in this example).

(Second Erroneous Operation Condition)

The accelerator pedal operation amount AP at the current time point is equal to or larger than a third predetermined amount Apb, and has decreased from the third predetermined amount Apb or more to a fourth predetermined amount APc or less within a predetermined period immediately before the current time point.

The period in which the erroneous operation state of the accelerator pedal is determined to have occurred (a period from the erroneous operation determination start time point to the erroneous operation determination end time point) may be referred to as "erroneous operation determination period" for the sake of convenience. Further, a period from the erroneous operation determination end time point until determination of elapse of the predetermined consideration period (Tminashi) may be referred to as "erroneous operation consideration period" for convenience.

On the basis of this definition, the above-mentioned specific period is a period containing the erroneous operation determination period and the erroneous operation consideration period.

In this manner, the first device continues automatic braking irrespective of the accelerator pedal operation amount AP (in other words, even when AP>APpcsth is established) also in the erroneous operation consideration period in addition to the erroneous operation determined period.

Automatic braking is therefore continued within the specific period, and thus it is possible to continuously apply to the vehicle a braking force for preventing collision with an object. Meanwhile, when the accelerator pedal 201 is strongly depressed outside the specific period (AP>APpcsth), it can be determined that the driver has an "intention to cancel automatic braking". Thus, in that case, the first device stops (cancels) automatic braking.

At this time, the first device determines that the above-mentioned erroneous operation state is effective in the erroneous operation determination period. Further, the first device determines that the erroneous operation state is effective in the erroneous operation consideration period. Thus, the first device does not stop and continues PCS automatic braking even when the accelerator pedal operation amount AP becomes equal to or larger than the automatic braking stop threshold value APpcsth in the erroneous operation consideration period.

The erroneous operation condition may accidentally not be satisfied due to an operation by a "driver in a panicked state" satisfying the erroneous operation condition. After the erroneous operation condition is accidentally not satisfied in this manner, the driver may depress the accelerator pedal 201 without intention so that the accelerator pedal operation amount AP becomes equal to or larger than the automatic braking stop threshold value APpcsth. The first device does not stop PCS automatic braking even when there occurs an accelerator pedal operation causing the accelerator pedal operation amount AP to be equal to or larger than the automatic braking stop threshold value APpcsth in the erroneous operation consideration period. Therefore, the first device can reliably execute PCS automatic braking control even when the driver is still in the panicked state in the erroneous operation consideration period and there occurs an unintentional operation of the accelerator pedal 201 described above.

Figure 3:
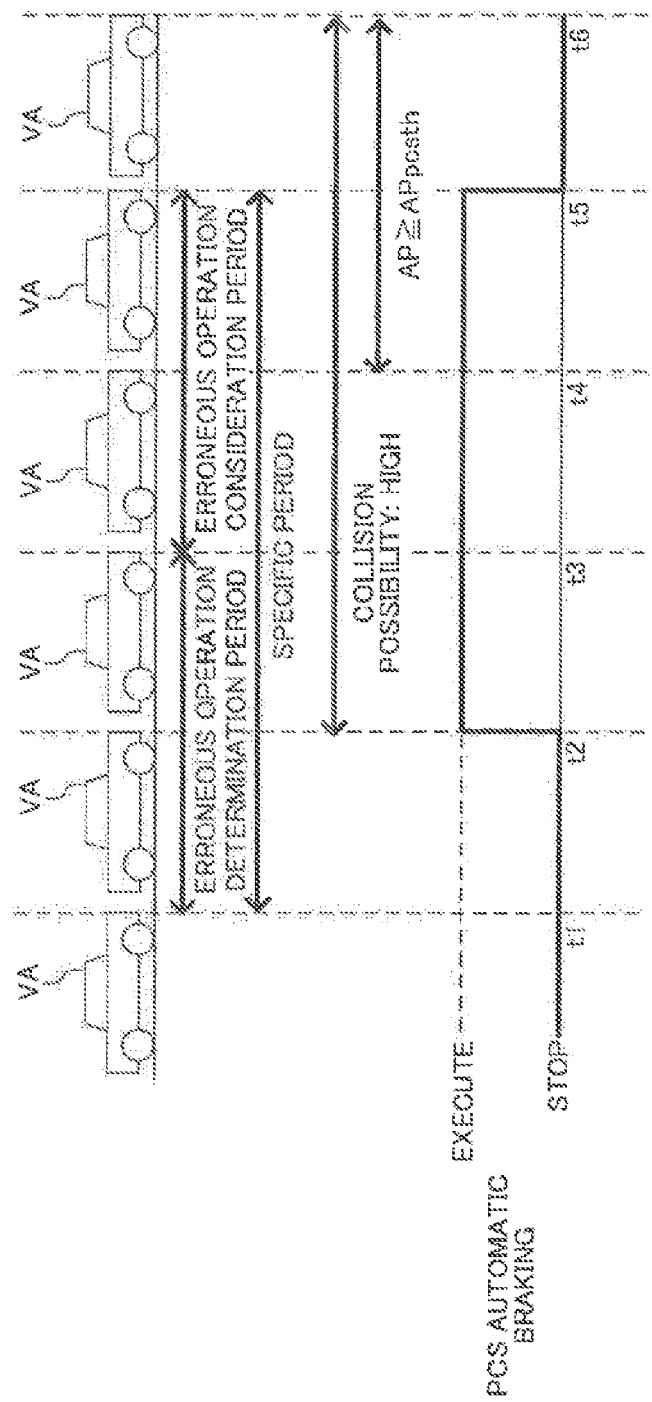
FIG. 3 is a time chart for illustrating an outline of an operation of the first device.

Now, a description is given of an outline of an operation of the first device through use of an example illustrated in FIG. 3.

In the example illustrated in FIG. 3, all the following "condition A to condition D" described below are satisfied.

Condition A: A period of from a time point t1 to a time point t3 is the erroneous operation determination period.

Condition B: A period of from the time point t3 to a time point t5 is the erroneous operation consideration period.

Condition C: The vehicle VA is likely to collide with an object (has a high collision possibility) in a period of from a time point t2 to a time point t6.

Condition D: The accelerator pedal operation amount AP is equal to or larger than the automatic braking stop threshold value APpcsth in a period of from a time point t4 to the time point t6.

The collision possibility becomes high at the time point t2 (refer to Condition C) and the accelerator pedal operation amount AP is smaller than the automatic braking stop threshold value APpcsth (refer to Condition D), and thus the first device starts execution of PCS automatic braking at the time point t2. The "erroneous operation condition satisfied at the time point t1" is no longer satisfied at the time point t3 (refer to Condition A), and the erroneous operation consideration period starts. This erroneous operation consideration period ends at the time point t5 (refer to Condition B). Thus, a period of from the time point t1 to the time point t5 is the specific period.

At the time point t4, the accelerator pedal operation amount AP is equal to or larger than the automatic braking stop threshold value APpcsth (refer to Condition D). However, the time point t4 is within the erroneous operation consideration period, and thus the first device does not stop and continues the PCS automatic braking. After that, the erroneous operation consideration period ends at the time point t5, and the erroneous operation state is not determined to occur. Further, the accelerator pedal operation amount AP is equal to or larger than the automatic braking stop threshold value APpcsth at the time point t5, and thus the first device stops execution of the PCS automatic braking.

(Specific Operation)

Next, a description is given of a specific operation of the first device.

1. Start of Operation of PCS Automatic Braking

Figure 4:
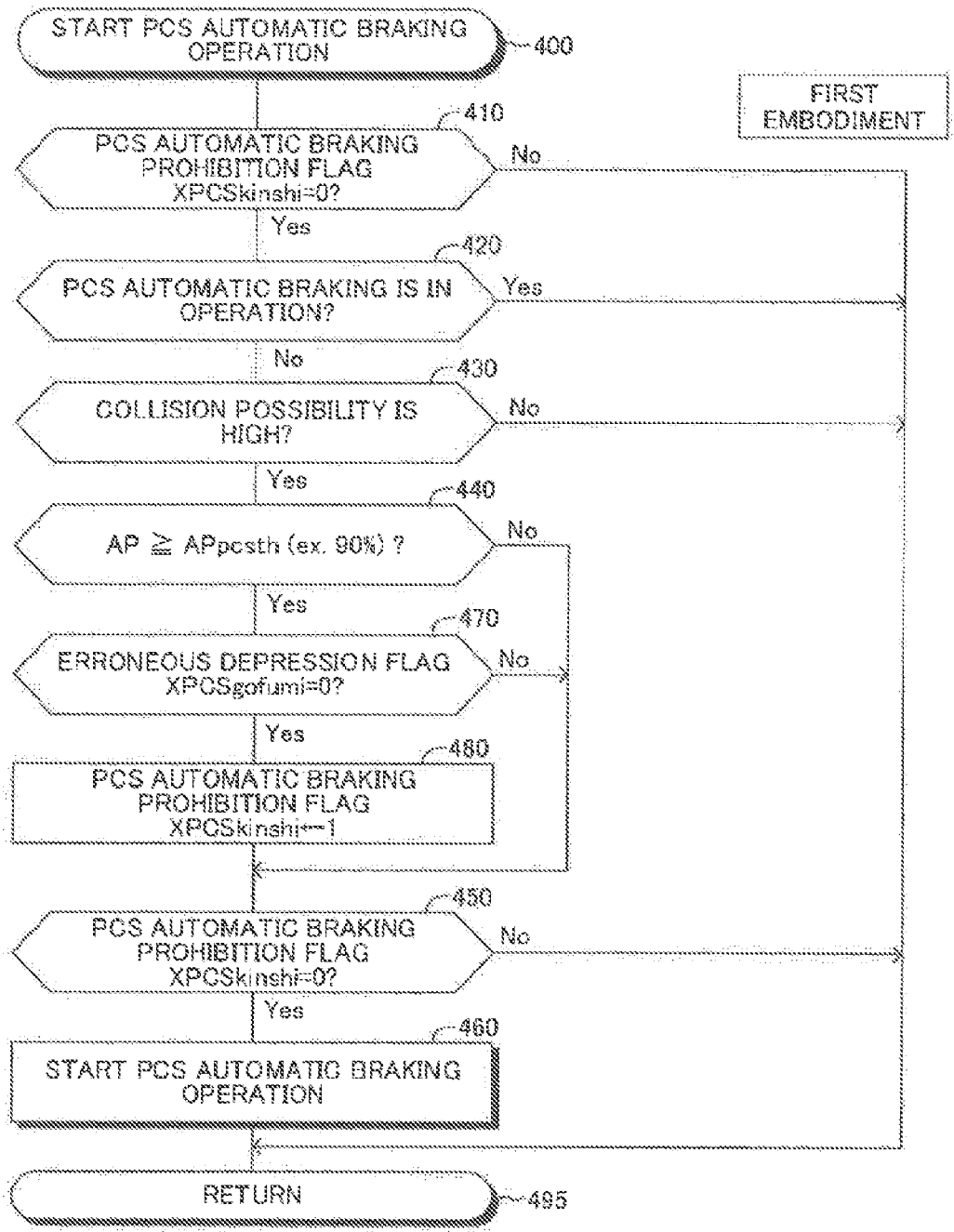
FIG. 4 is a flowchart for illustrating a routine to be executed by a CPU of a driving support ECU illustrated in FIG. 2.

The CPU (when simply described as "CPU", "CPU" means the CPU of the DSECU 20 unless otherwise specified) of the DSECU 20 is configured to execute a routine (PCS automatic braking operation start routine) illustrated in the flowchart of FIG. 4 every time a predetermined period of time elapses.

Thus, when a predetermined timing has arrived, the CPU starts the processing from Step 400 of FIG. 4, and proceeds to Step 410 to determine whether or not the value of a PCS automatic braking prohibition flag (hereinafter sometimes simply referred to as "prohibition flag") XPCSkinshi is "0". The value of the prohibition flag XPCSkinshi is set to "0" at an initialization routine to be executed by the CPU when an ignition key switch (not shown) of the vehicle VA is changed from an off position to an on position. As described later, when the value of the prohibition flag XPCSkinshi is "1", the PCS automatic braking is prohibited (not executed).

When the value of the prohibition flag XPCSkinshi is "0", the CPU determines "Yes" in Step 410, and proceeds to Step 420 to determine whether or not the PCS automatic braking is in operation at the current time point.

When the PCS automatic braking is not in operation (stopped) at the current time point, the CPU determines "No" in Step 420, and proceeds to Step 430 to determine whether or not the vehicle VA is likely to collide with an object (e.g., obstacles such as other vehicles). That is, in Step 430, the CPU determines whether or not a predetermined condition indicating that the vehicle is likely to collide with the detected object is satisfied.

More specifically, the CPU calculates a time to collision (TTC, hereinafter sometimes referred to as "time to collision TTC") based on the above-mentioned definitive object information (or object information acquired by the millimeter wave radar device 21). That is, the CPU calculates the time to collision TTC by substituting "a distance D to the object and a relative speed V of the object" being the object information into Expression (1). The CPU may calculate the time to collision TTC by further considering the acceleration and/or derivative (relative acceleration) of the relative speed at the current time point of the vehicle VA.

$$TTC = D/V \quad (1)$$

Then, the CPU determines whether or not the time to collision TTC is equal to or smaller than a threshold period TTCth for automatic braking, and when the time to collision TTC is equal to or smaller than the threshold period TTCth, the CPU determines that the vehicle VA is likely to collide with the object (the predetermined condition is satisfied and the collision possibility is high). Determination of such collision possibility is widely known, and for example, a technology disclosed in, for example, Japanese Patent Application Laid-open No. 2010-282350, Japanese Patent Application Laid-open No. 2012-229722, and Japanese Patent Application Laid-open No. 2014-93040 can be applied. When a plurality of objects are detected, the CPU selects an object having the minimum time to collision TTC as a collision target, and determines whether or not the time to collision TTC (that is, the minimum time to collision TTC among the plurality of objects) of the selected collision target is equal to or smaller than the threshold period TTCth.

When the time to collision TTC is equal to or smaller than the threshold period TTCth, the CPU determines "Yes" in Step 430, and proceeds to Step 440 to determine whether or not the accelerator pedal operation amount AP is equal to or larger than the PCS automatic braking stop threshold value APpcsth. For example, this threshold value APpcsth is a value corresponding to 90% of the accelerator pedal operation amount AP when the maximum value of the accelerator pedal operation amount AP is set as 100%. This threshold value APpcsth is a value larger than "0", and is only required to be a value that enables determination that the driver has a definite intention to accelerate the vehicle.

When the accelerator pedal operation amount AP is smaller than the PCS automatic braking stop threshold value APpcsth, it can be estimated that the operation of the accelerator pedal 201 is not an operation (hereinafter sometimes referred to as "intentional operation") of the driver intending to avoid collision (in other words, intending to cancel PCS automatic braking). Thus, in this case, the CPU determines "No" in Step 440, and proceeds to Step 450 to determine whether or not the value of the prohibition flag XPCSkinshi is "0".

When the value of the prohibition flag XPCSkinshi is "0", the CPU determines "Yes" in Step 450, and proceeds to Step 460 to start an operation of PCS automatic braking. That is, the CPU sets the magnitude of a required deceleration Gpcs based on PCS automatic braking to a predetermined value (variable value) larger than "0", and transmits this required deceleration Gpcs to the engine ECU 30 and the brake ECU 40. The CPU sets this required deceleration Gpcs to a value that enables the vehicle VA to stop before colliding with the "object likely to collide with the vehicle VA" or a maximum deceleration that can be generated by the vehicle VA by automatic braking. After that, the CPU proceeds to Step 495 to temporarily end this routine.

Meanwhile, the brake ECU 40 executes a routine (not shown) to calculate a braking operation required deceleration Gbpd based on the brake pedal operation amount BP. The braking operation required deceleration Gbpd is calculated to be a larger value as the brake pedal operation amount BP becomes larger. Further, the brake ECU 40 adopts a larger one of the braking operation required deceleration Gbpd and the required deceleration Gpcs based on the PCS automatic braking as the target deceleration, and controls the brake actuator 43 so that the vehicle VA generates a deceleration equal to the target deceleration. As a result, even when the brake pedal 202 is not operated, a braking force is automatically applied to the vehicle VA. That is, the PCS automatic braking is executed. When the engine ECU 30 receives the required deceleration Gpcs, the engine ECU 30 sets the target throttle valve opening degree TAtgt to "0 (minimum value)".

Meanwhile, when the accelerator pedal operation amount AP is equal to or larger than the PCS automatic braking stop threshold value APpcsth at the time of execution of the processing of Step 440 by the CPU, the operation of the accelerator pedal 201 can be estimated to be any one of the above-mentioned intended operation and an erroneous operation of the accelerator pedal 201 by the driver. When the erroneous operation is performed, the accelerator pedal 201 tends to be strongly depressed and the accelerator pedal operation amount AP tends to become larger.

Thus, in this case, the CPU determines "Yes" in Step 440, and proceeds to Step 470 to determine whether or not the value of the erroneous depression flag XPCSgofumi is "0". This value of the erroneous depression flag XPCSgofumi is set to "0" in the initialization routine described above. As described later, the value of the erroneous depression flag XPCSgofumi is set to "1" in the erroneous operation determination period and the erroneous operation consideration period.

When the value of the erroneous depression flag XPCSgofumi is "0", the erroneous depression state is not detected, and thus the operation of the accelerator pedal 201 for which the accelerator pedal operation amount AP is set to the PCS automatic braking stop threshold value APpcsth or more can be estimated to be an intended operation by the driver. Thus, the CPU determines "Yes" in Step 470, proceeds to Step 480 to set the value of the prohibition flag XPCSkinshi to "1", and proceeds to Step 450. The value of the prohibition flag XPCSkinshi is set to "1", and thus the CPU determines "No" in Step 450, and directly proceeds to Step 495. As a result, even when the vehicle is determined to be likely to collide with an object in Step 430, the operation of PCS automatic braking is not started in a case where the accelerator pedal 201 is strongly depressed and the erroneous operation state is not detected.

On the contrary, when the value of the erroneous depression flag XPCSgofumi is "1" at the time of execution of the processing of Step 470 by the CPU, the erroneous depression state is detected. Thus, the operation of the accelerator pedal 201 for which the accelerator pedal operation amount AP is set to the PCS automatic braking stop threshold value APpcsth or more can be estimated to be an erroneous operation by the driver. In this case, the CPU determines "No" in Step 470, and directly proceeds to Step 450 without executing the processing of Step 480. That is, when the operation of the accelerator pedal 201 is determined to be in the erroneous operation state even in a case where the accelerator pedal operation amount AP is equal to or larger than the PCS automatic braking stop threshold value APpcsth, the value of the prohibition flag XPCSkinshi is not set to "1", and the CPU proceeds to Step 450 with the value being set to "0". Thus, the CPU determines "Yes" in Step 450, and proceeds to Step 460. As a result, when the accelerator pedal 201 is strongly depressed and the erroneous operation state is detected, the operation of PCS automatic braking is started.

Further, when the CPU determines "No" in Step 410 or Step 430, or determines "Yes" in Step 420, the CPU directly proceeds to Step 495 from the corresponding step to temporarily end this routine. Thus, the operation of PCS automatic braking is not started in those cases.

2. End (Stop) of PCS Automatic Braking

Figure 5:
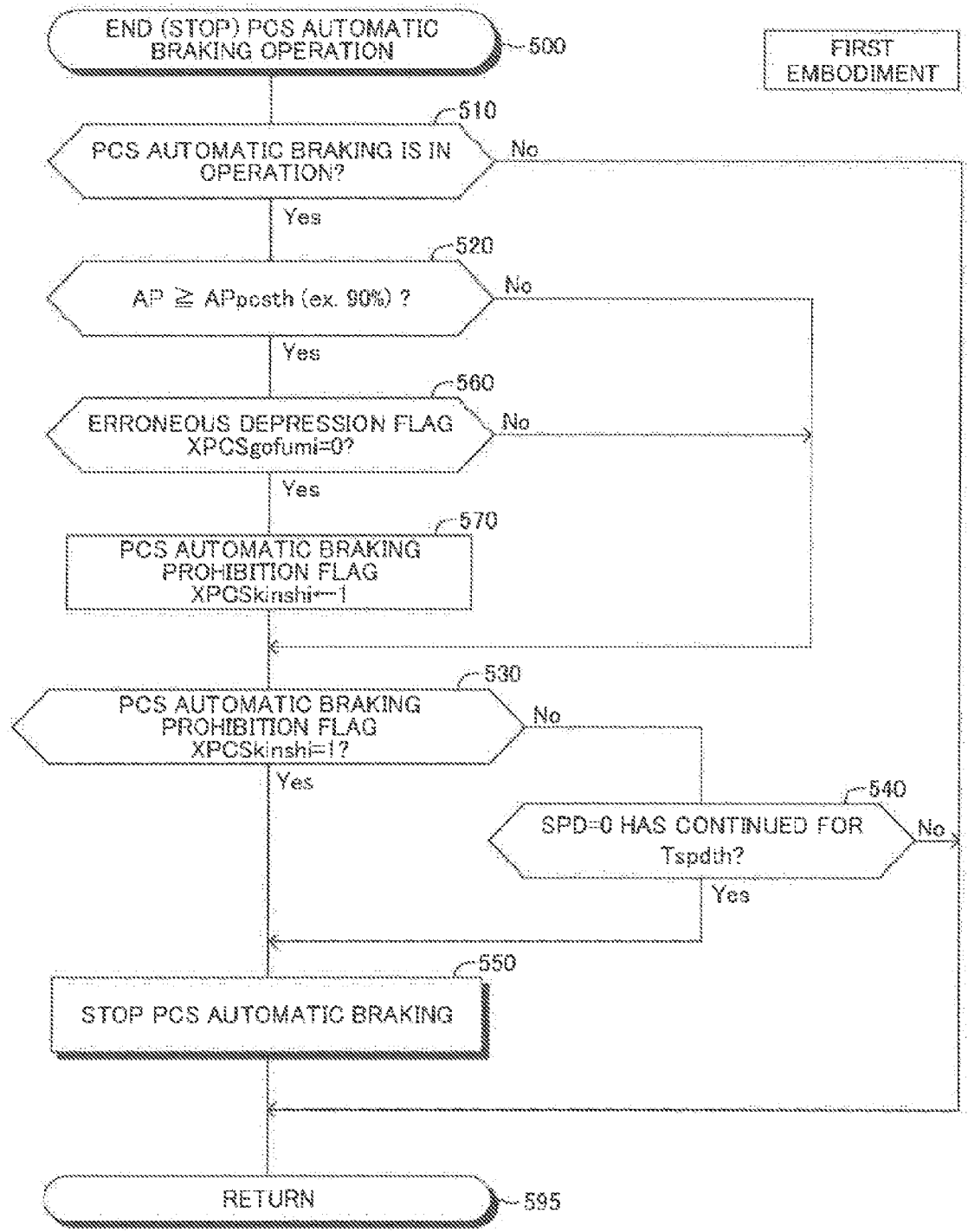
FIG. 5 is a flowchart for illustrating a routine to be executed by the CPU of the driving support ECU illustrated in FIG. 2.

The CPU is configured to execute a routine (PCS automatic braking operation end routine) illustrated in the flowchart of FIG. 5 every time a predetermined period of time elapses.

Thus, when a predetermined timing has arrived, the CPU starts the processing from Step 500 of FIG. 5, and proceeds to Step 510 to determine whether or not PCS automatic braking is in operation. When PCS automatic braking is not in operation, the CPU determines "No" in Step 510, and directly proceeds to Step 595 to temporarily end this routine.

On the contrary, when the PCS automatic braking is in operation, the CPU determines "Yes" in Step 510, and proceeds to Step 520 to determine whether or not the accelerator pedal operation amount AP is equal to or larger than the PCS automatic braking stop threshold value APpcsth. As described above, this threshold value APpcsth is, for example, a value corresponding to 90% of the accelerator pedal operation amount AP when the maximum value of the accelerator pedal operation amount AP is set as 100%. This threshold value APpcsth is only required to be a value larger than "0".

When the accelerator pedal operation amount AP is smaller than the PCS automatic braking stop threshold value APpcsth, it can be estimated that the driver is not intentionally operating the accelerator pedal 201. Thus, the CPU determines "No" in Step 520, and proceeds to Step 530 to determine whether or not the value of the prohibition flag XPCSkinshi is "1".

In this case, processing of Step 570 described later has not been executed at the time of execution of the processing of Step 530 by the CPU, and thus the value of the prohibition flag XPCSkinshi is "0". Thus, the CPU determines "No" in Step 530, and proceeds to Step 540 to determine whether or not a state in which PCS automatic braking is in operation and the vehicle speed SPD is "0" (namely, vehicle stopped state) has continued for a threshold period Tspdth or more. When the state in which automatic braking is in operation and the vehicle speed SPD is "0" has not continued for the threshold period Tspdth or more, the CPU determines "No" in Step 540, and proceeds to Step 595 to temporarily end this routine. As a result, the PCS automatic braking is continued.

When the value of the prohibition flag XPCSkinshi remains to be "0" and the "state in which automatic braking is in operation and the vehicle speed SPD is '0'" has continued for the threshold period Tspdth or more, the CPU proceeds to Step 540 to determine "Yes", and proceeds to Step 550. In Step 550, the CPU ends (stops) the PCS automatic braking. That is, the CPU sets the magnitude of the required deceleration Gpcs based on PCS automatic braking to "0". After that, the CPU proceeds to Step 595 to temporarily end this routine. As a result, the PCS automatic braking is stopped (ended).

On the contrary, when the accelerator pedal operation amount AP is equal to or larger than the PCS automatic braking stop threshold value APpcsth at the time of execution of the processing of Step 520 by the CPU, the operation of the accelerator pedal 201 can be estimated to be any one of an intended operation and an erroneous operation. Thus, in this case, the CPU determines "Yes" in Step 520, and proceeds to Step 560 to determine whether or not the value of the erroneous depression flag XPCSgofumi is "0".

When the value of the erroneous depression flag XPCSgofumi is "0", the operation of the accelerator pedal 201 causing the accelerator pedal operation amount AP to be equal to or larger than the PCS automatic braking stop threshold value APpcsth can be estimated to be an intended operation by the driver described above. Thus, in this case, the CPU determines "Yes" in Step 560, and proceeds to Step 570 to set the value of the prohibition flag XPCSkinshi to "1". After that, the CPU proceeds to Step 530.

In this case, in Step 570, the value of the prohibition flag XPCSkinshi is set to "1", and thus the CPU determines "Yes" in Step 530, and proceeds to Step 540. As a result, the operation of PCS automatic braking is stopped.

On the contrary, when the value of the erroneous depression flag XPCSgofumi is "1" at the time of execution of the processing of Step 560 by the CPU, the operation of the accelerator pedal 201 causing the accelerator pedal operation amount AP to be equal to or larger than the PCS automatic braking stop threshold value APpcsth can be estimated to be an erroneous operation by the driver. Thus, in this case, the CPU determines "No" in Step 560, and proceeds to Step 530 without executing the processing of Step 570 (without setting the value of the prohibition flag XPCSkinshi to "1"). When the PCS automatic braking is in operation, the value of the prohibition flag XPCSkinshi is "0" unless the value of the prohibition flag XPCSkinshi is set to "1" in Step 570. Thus, the CPU determines "No" in Step 530, and proceeds to Step 540. When the CPU determines "Yes" in Step 540, the operation of PCS automatic braking is stopped, whereas when the CPU determines "No" in Step 540, the operation of PCS automatic braking is continued.

Thus, when the accelerator pedal operation amount AP becomes equal to or larger than the PCS automatic braking stop threshold value APpcsth during the operation of PCS automatic braking ("Yes" in Step 520) and the value of the erroneous depression flag XPCSgofumi is "0" ("Yes" in Step 560), the CPU sets the value of the prohibition flag XPCSkinshi to "1" and stops the operation of PCS automatic braking. On the contrary, when the value of the erroneous depression flag XPCSgofumi is "1" ("No" in Step 560), the CPU continues the operation of PCS automatic braking without setting the value of the prohibition flag XPCSkinshi to "1".

3. Resetting of PCS Automatic Braking Prohibition Flag XPCSkinshi

Figure 6:
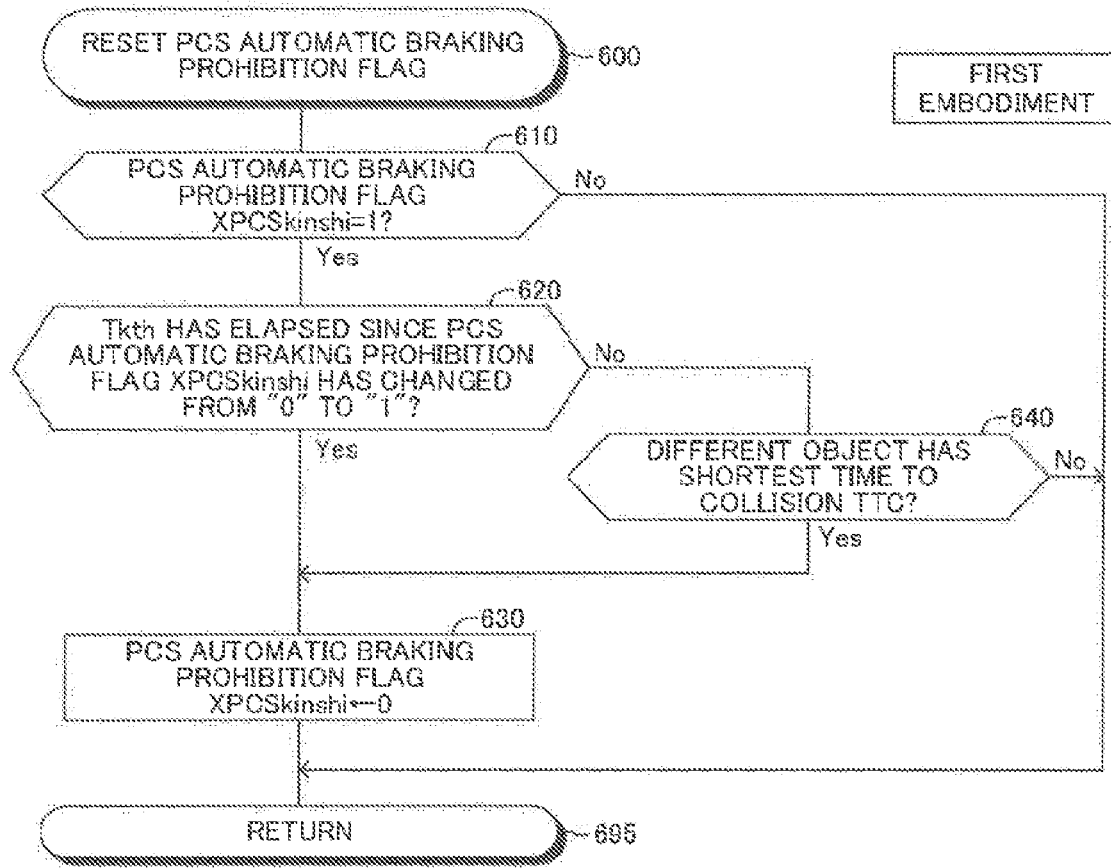
FIG. 6 is a flowchart for illustrating a routine to be executed by the CPU of the driving support ECU illustrated in FIG. 2.

The CPU is configured to execute a routine (PCS automatic braking prohibition flag resetting routine) illustrated in the flowchart of FIG. 6 every time a predetermined period of time elapses.

Thus, when a predetermined timing has arrived, the CPU starts the processing from Step 600 of FIG. 6, and proceeds to Step 610 to determine whether or not the value of the prohibition flag XPCSkinshi is "1". When the value of the prohibition flag XPCSkinshi is not "1", the CPU determines "No" in Step 610, and proceeds to Step 695 to temporarily end this routine.

On the contrary, when the value of the prohibition flag XPCSkinshi is "1", the CPU determines "Yes" in Step 610, and proceeds to Step 620. In Step 620, the CPU determines whether or not a threshold period Tkth (e.g., 20 seconds) has elapsed since the value of the prohibition flag XPCSkinshi changed from "0" to "1". When the threshold period Tkth has elapsed since the value of the prohibition flag XPCSkinshi has changed from "0" to "1", the CPU determines "Yes" in Step 620, and proceeds to Step 630 to set (reset) the value of the prohibition flag XPCSkinshi to "0". After that, the CPU proceeds to Step 695 to temporarily end this routine.

On the contrary, when the threshold period Tkth has not elapsed since the value of the prohibition flag XPCSkinshi changed from "0" to "1" at the time of execution of the processing of Step 620 by the CPU, the CPU determines "No" in Step 620, and proceeds to Step 640. In Step 640, the CPU determines whether or not an object having the shortest time to collision TTC at the current time point and an "object (object determined to have a high collision possibility in Step 430 of FIG. 4) determined to have a high collision possibility and having caused start of PCS automatic braking" are different from each other.

When the value of the erroneous depression flag XPCSgofumi is "0", the value of the PCS automatic braking prohibition flag XPCSkinshi is set to "1" before start of PCS automatic braking (refer to Step 480 of FIG. 4) or during the operation of PCS automatic braking (refer to Step 570 of FIG. 5). Thus, when the CPU proceeds to Step 640, the driver recognizes an object (namely, an object having caused start of PCS automatic braking) determined to have a high collision possibility in Step 430 of FIG. 4, and intentionally strongly depresses the accelerator pedal 201 to cause the accelerator pedal operation amount AP to be equal to or larger than the PCS automatic braking stop threshold value APpcsth. Thus, when an object having the shortest time to collision TTC at the current time point and an object having caused start of PCS automatic braking are the same as each other, the driver can be estimated to recognize the object also at the current time point. Therefore, in this case, the CPU determines "No" in Step 640 of FIG. 6, and proceeds to Step 695 without executing the processing of Step 630. As a result, the PCS automatic braking is not executed with the value of the prohibition flag XPCSkinshi remaining to be set to "1".

While the PCS automatic braking is not executed due to an intentional operation by the driver (that is, while the value of PCS automatic braking prohibition flag XPCSkinshi is set to "1"), an object having the shortest time to collision TTC may no longer be an object having caused start of the PCS automatic braking. In this case, the driver may not be recognizing the object having the shortest time to collision TTC at the current time point, and thus the PCS automatic braking is required to be operated. Thus, when the object having the shortest time to collision TTC at the current time point and the object determined to have a high collision possibility in Step 430 of FIG. 4 are different from each other, the CPU determines "Yes" in Step 640 of FIG. 6, proceeds to Step 630 to set the value of the prohibition flag XPCSkinshi to "0", and proceeds to Step 695.

4. Simultaneous Depression Determination (Determination of First Erroneous Operation Condition)

Next, a description is given of simultaneous depression determination of determining whether or not an "operation (simultaneous depression) of depressing both of the accelerator pedal 201 and the brake pedal 202" is performed. The CPU executes a routine illustrated in the flowchart of FIG. 7 to execute the simultaneous depression determination.

Figure 7:
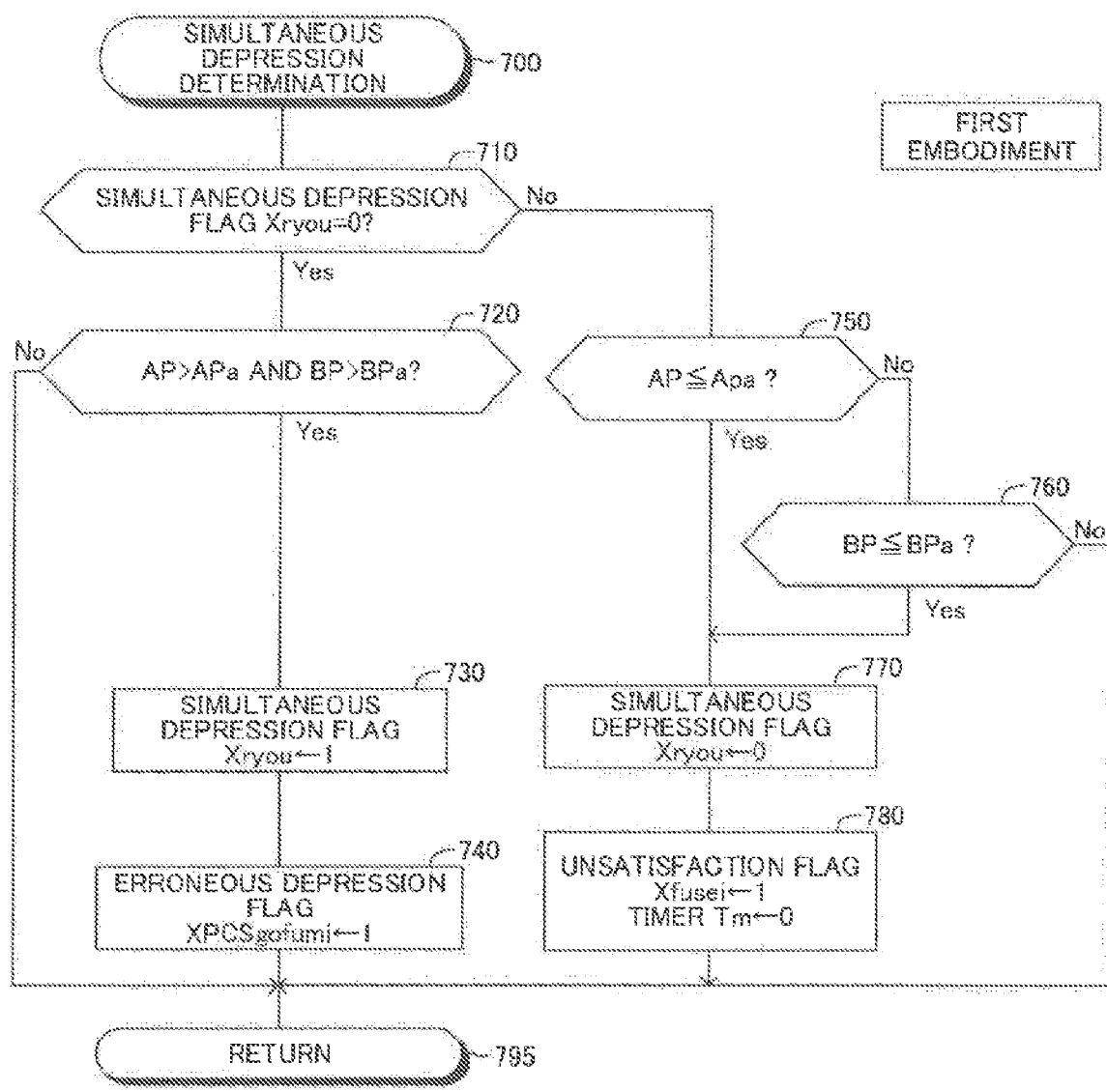
FIG. 7 is a flowchart for illustrating a routine to be executed by the CPU of the driving support ECU illustrated in FIG. 2.

The CPU is configured to execute a simultaneous depression determination routine illustrated in the flowchart of FIG. 7 every time a predetermined period of time elapses.

Thus, when a predetermined timing has arrived, the CPU starts the processing from Step 700 of FIG. 7, and proceeds to Step 710 to determine whether or not the value of a simultaneous depression flag Xryou is "0". The value of the simultaneous depression flag Xryou is set to "0" in the above-mentioned initialization routine.

When the value of the simultaneous depression flag Xryou is "0", the CPU determines "Yes" in Step 710, and proceeds to Step 720 to determine whether or not the accelerator pedal operation amount AP is larger than the first predetermined amount APa and the brake pedal operation amount BP is larger than the second predetermined amount BPa ("0" in this example). The first predetermined amount APa is a value larger than "0", and is, for example, a value corresponding to 17% of the accelerator pedal operation amount when the maximum value of the accelerator pedal operation amount is set as 100%.

When the accelerator pedal operation amount AP is larger than the first predetermined amount APa and the brake pedal operation amount BP is larger than the second predetermined amount BPa, the CPU determines that the driver is performing simultaneous depression. That is, the CPU determines that the first erroneous operation condition is satisfied. Thus, the CPU determines "Yes" in Step 720, executes processing of Step 730 and Step 740 in the stated order, and proceeds to Step 795 to temporarily end this routine.

Step 730: The CPU sets the value of the simultaneous depression flag Xryou to "1".

Thus, the value of the simultaneous depression flag Xryou is set to "1" when the accelerator pedal 201 and the brake pedal 202 are depressed.

Step 740: The CPU sets the erroneous depression flag XPCSgofumi to "1".

When the driver is determined to be performing any one of simultaneous depression and "re-depression described later", the value of the erroneous depression flag XPCSgofumi is set to "1". In this case, "Yes" is determined (in other words, simultaneous depression is determined to be performed) in Step 720, and thus the value of the erroneous depression flag XPCSgofumi is set to "1" in Step 740.

In this manner, when the accelerator pedal operation amount AP is larger than the first predetermined amount APa and the brake pedal operation amount BP is larger than the second predetermined amount BPa, a simultaneous erroneous operation condition (first erroneous operation condition), which is one erroneous operation condition, is satisfied, and then, the CPU determines that a simultaneous depression erroneous operation state has occurred, and sets the values of the simultaneous depression flag Xryou and the erroneous depression flag XPCSgofumi to "1".

On the contrary, when at least one of a condition that the accelerator pedal operation amount AP is equal to or smaller than the first predetermined amount APa or a condition that the brake pedal operation amount BP is equal to or smaller than the second predetermined amount BPa is satisfied at the time of execution of the processing of Step 720 by the CPU, the CPU determines "No" in Step 720, and directly proceeds to Step 795. As a result, each of the simultaneous depression flag Xryou and the erroneous depression flag XPCSgofumi is not set to "1".

On the contrary, when the CPU proceeds to Step 710 again under a state in which the value of the simultaneous depression flag Xryou is set to "1", the CPU determines "No" in Step 710, and proceeds to Step 750. Then, in Step 750, the CPU determines whether or not the accelerator pedal operation amount AP is equal to or smaller than the first predetermined amount APa.

When the accelerator pedal operation amount AP is still larger than the first predetermined amount APa, the CPU determines "No" in Step 750, and proceeds to Step 760 to determine whether or not the brake pedal operation amount BP is equal to or smaller than the second predetermined amount BPa. When the brake pedal operation amount BP is still larger than the second predetermined amount BPa, the CPU determines "No" in Step 760 by determining that the simultaneous depression is still being performed, and proceeds to Step 795 to temporarily end this routine.

On the contrary, when the CPU determines "Yes" in any one of Step 750 and Step 760, at least one of the condition that the accelerator pedal operation amount AP is equal to or smaller than the first predetermined amount APa or the condition that the brake pedal operation amount BP is equal to or smaller than the second predetermined amount BPa is satisfied. That is, the CPU determines that the first erroneous operation condition is not satisfied. In other words, the driver does not depress the accelerator pedal 201 and/or the brake pedal 202, which means that simultaneous depression is not being performed. Thus, the CPU executes the processing of Step 770 and Step 780 in the stated order, and proceeds to Step 795 to temporarily end this routine.

Step 770: The CPU sets the value of the simultaneous depression flag Xryou to "0".

Step 780: The CPU sets the value of an unsatisfaction flag Xfusei to "1". Further, the CPU sets (clears) the value of a timer Tm described later to "0".

The value of the unsatisfaction flag Xfusei is set to "0" in the above-mentioned initialization routine.

When at least one of the condition that the accelerator pedal operation amount AP is equal to or smaller than the first predetermined amount APa and the condition that the brake pedal operation amount BP is equal to or smaller than the second predetermined amount BPa is satisfied, the above-mentioned simultaneous erroneous operation condition (first erroneous operation condition), which has been satisfied so far, is no longer satisfied. With this, the CPU sets the value of the simultaneous depression flag Xryou to "0", and sets the value of the unsatisfaction flag Xfusei to "1" in order to execute erroneous depression time extension processing (refer to FIG. 9) described later.

5. Re-depression Determination (Determination of Second Erroneous Operation Condition)

Next, a description is given of re-depression determination of determining whether or not "an operation (re-depression) of depressing the accelerator pedal 201 again" is being performed "immediately after the depressing force of the accelerator pedal 201 is weakened". The CPU executes a routine illustrated in the flowchart of FIG. 8 to execute the re-depression determination.

Figure 8:
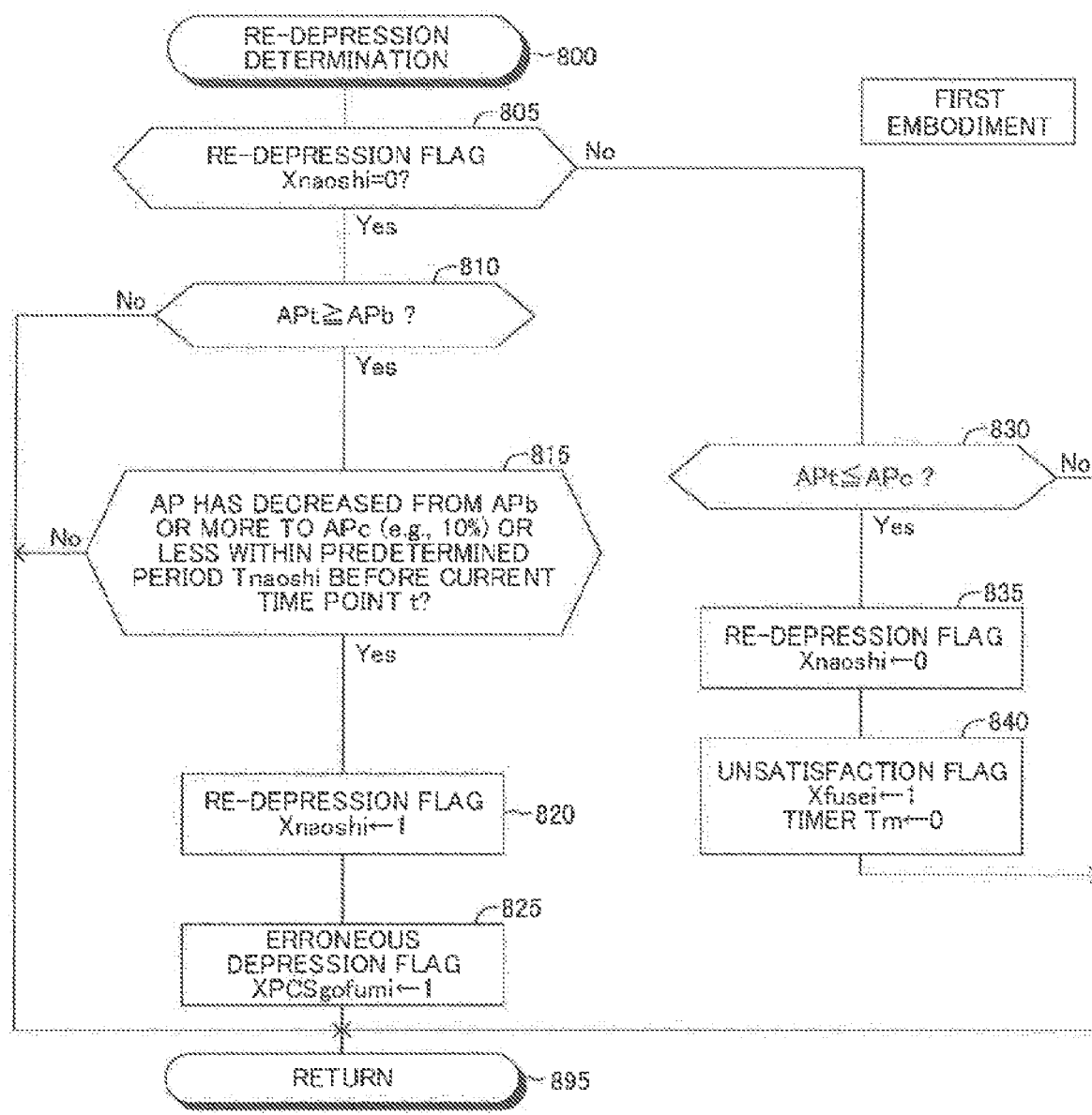
FIG. 8 is a flowchart for illustrating a routine to be executed by the CPU of the driving support ECU illustrated in FIG. 2.

The CPU is configured to execute a re-depression determination routine illustrated in the flowchart of FIG. 8 every time a predetermined period of time elapses.

Thus, when a predetermined timing has arrived, the CPU starts the processing from Step 800 of FIG. 8, and proceeds to Step 805 to determine whether or not the value of a re-depression flag Xnaoshi is "0". The value of the re-depression flag Xnaoshi is set to "0" in the above-mentioned initialization routine.

When the value of the re-depression flag Xnaoshi is "0", the CPU determines "Yes" in Step 805, and proceeds to Step 810. In Step 810, the CPU determines whether or not the accelerator pedal operation amount APt at a current time point t is equal to or larger than the third predetermined amount Apb. The third predetermined amount Apb is a value larger than "0", and is, for example, a value corresponding to 50% of the accelerator pedal operation amount when the maximum value of the accelerator pedal operation amount is set as 100%.

When the accelerator pedal operation amount APt at the current time point is equal to or larger than the third predetermined amount Apb, the driver is considered to be depressing the accelerator pedal 201 relatively strongly, and may be performing the above-mentioned re-depression. Thus, the CPU determines "Yes" in Step 810, and proceeds to Step 815.

In Step 815, the CPU determines whether or not the accelerator pedal operation amount AP has decreased from the third predetermined amount Apb or more to a fourth predetermined amount APc or less within a predetermined period Tnaoshi immediately before the current time point t. The fourth predetermined amount APc is a value larger than "0", and is a value smaller than the third predetermined amount Apb. For example, the fourth predetermined amount APc is a value corresponding to 10% of the accelerator pedal operation amount when the maximum value of the accelerator pedal operation amount is set as 100%.

When the accelerator pedal operation amount AP has decreased from the third predetermined amount Apb or more to the fourth predetermined amount APc or less within the above-mentioned predetermined period, this means that the depressing force of the accelerator pedal 201 is weakened within the predetermined period. Further, "Yes" is determined in Step 810, and thus this means that the accelerator pedal 201 is depressed again after the depressing force is weakened. In this case, the CPU determines that re-depression is being performed. That is, the CPU determines that the second erroneous operation condition is satisfied. Thus, the CPU determines "Yes" in Step 815, executes processing of Step 820 and Step 825 in the stated order, and proceeds to Step 895 to temporarily end this routine.

Step 820: The CPU sets the value of the re-depression flag Xnaoshi to Thus, the value of the re-depression flag Xnaoshi is set to "1" when the above-mentioned depression is being performed.

Step 825: The CPU sets the erroneous depression flag XPCSgofumi to "1".

In this manner, when "Yes" is determined in Step 815, a re-depression erroneous operation condition (second erroneous operation condition), which is one of the erroneous operation conditions, is satisfied, and thus the CPU determines that a re-depression erroneous operation state has occurred, and sets the values of the re-depression flag Xnaoshi and the erroneous depression flag XPCSgofumi to "1".

On the contrary, when the accelerator pedal operation amount AP has not decreased from the third predetermined amount Apb or more to the fourth predetermined amount APc or less within the above-mentioned predetermined period at the time of execution of the processing of Step 815 by the CPU, the CPU determines that re-depression is not being performed. Thus, the CPU determines "No" in Step 815, and proceeds to Step 895 to temporarily end this routine. As a result, each of the re-depression flag Xnaoshi and the erroneous depression flag XPCSgofumi is not set to "1".

On the contrary, when the CPU proceeds to Step 805 again under a state in which the value of the re-depression flag Xnaoshi is set to "1", the CPU determines "No" in Step 805, and proceeds to Step 830. Then, in Step 830, the CPU determines whether or not the accelerator pedal operation amount APt at the current time point is equal to or smaller than the fourth predetermined amount APc.

When the accelerator pedal operation amount APt at the current time point t is equal to or smaller than the fourth predetermined amount APc, this means that the accelerator pedal operation amount APt becomes equal to or smaller than the fourth predetermined amount APc as a result of the depressing force of the accelerator pedal 201, for which the accelerator pedal operation amount AP has been determined to be equal to or larger than the third predetermined amount Apb in Step 810, being weakened. Thus, the CPU determines that depression of the accelerator pedal 201 by re-depression is temporarily stopped (canceled) because the accelerator pedal operation amount APt has become sufficiently small. In other words, the CPU determines that the second erroneous operation condition is no longer satisfied. Thus, the CPU determines "Yes" in Step 830, executes the processing of Step 835 and Step 840 in the stated order, and proceeds to Step 895 to temporarily end this routine.

Step 835: The CPU sets the value of the re-depression flag Xnaoshi to "0".

Step 830: The CPU sets the value of the above-mentioned unsatisfaction flag Xfusei to "1". Further, the CPU sets (clears) the value of the timer TM described later to "0".

In this manner, when the value of the re-depression flag Xnaoshi is "1" and the accelerator pedal operation amount AP has become equal to or smaller than the fourth predetermined amount APc, the above-mentioned re-depression erroneous operation condition (second erroneous operation condition), which has been satisfied so far, is no longer satisfied. With this, the CPU sets the value of the re-depression flag Xnaoshi to "0", and sets the value of the unsatisfaction flag Xfusei to "1" in order to execute the erroneous depression time extension processing (refer to FIG. 9) described later.

On the contrary, when the accelerator pedal operation amount APt is larger than the fourth predetermined amount APc, the CPU determines that depression of the accelerator pedal 201 by re-depression is still continuing. Thus, the CPU determines "No" in Step 850, and directly proceeds to Step 895 to temporarily end this routine.

6. Extension of Erroneous Depression Period (Setting of Erroneous Operation Consideration Period)

Figure 9:
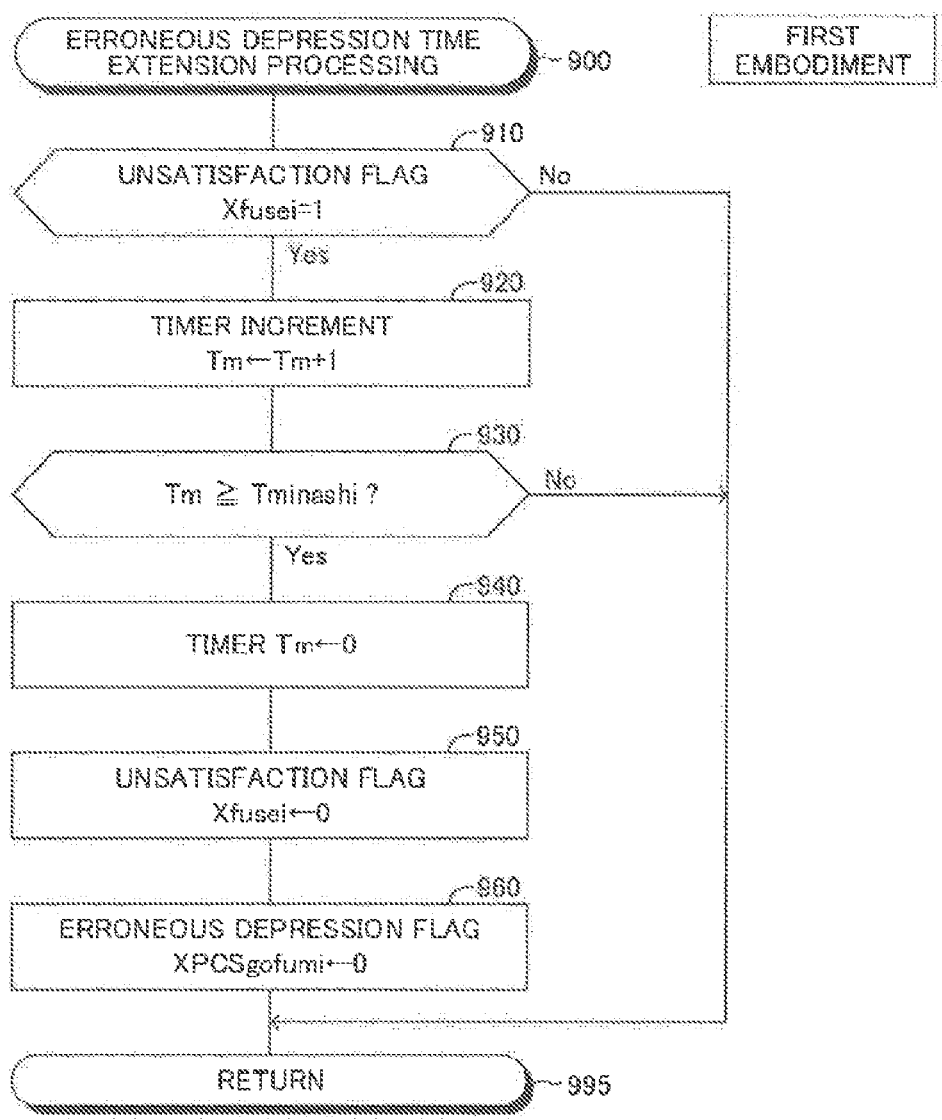
FIG. 9 is a flowchart for illustrating a routine to be executed by the CPU of the driving support ECU illustrated in FIG. 2.

The CPU is configured to execute a routine (erroneous depression period extension routine) illustrated in the flowchart of FIG. 9 every time a predetermined period of time elapses.

Thus, when a predetermined timing has arrived, the CPU starts the processing from Step 900 of FIG. 9, and proceeds to Step 910 to determine whether or not the value of the unsatisfaction flag Xfusei is "1".

When the value of the unsatisfaction flag Xfusei is "1", the CPU determines "Yes" in Step 910, and proceeds to Step 920 to increase the value of the timer Tm by "1". This timer Tm is a timer for measuring a period for which the value of the unsatisfaction flag Xfusei is continued to be "1". In other words, the timer Tm is a timer for measuring a period of time elapsed since the satisfied erroneous operation condition is no longer satisfied (any later one of the time point at which the first erroneous operation condition is no longer satisfied and the time point at which the second erroneous operation condition is no longer satisfied).

Next, the CPU proceeds to Step 930 to determine whether or not the value of the timer Tm is equal to or larger than the predetermined consideration period Tminashi. This consideration period Tminashi is set to a period of time sufficient enough for PCS automatic braking to stop the vehicle VA. For example, the consideration period Tminashi is, for example, about three seconds. When the value of the timer Tm is smaller than the consideration period Tminashi, the CPU determines "No" in Step 930, and directly proceeds to Step 995 to temporarily end this routine.

On the contrary, when the value of the timer Tm is equal to or larger than the consideration period Tminashi, the CPU determines "Yes" in Step 930, executes processing of from Step 940 to Step 960, and proceeds to Step 995.

Step 940: The CPU sets (clears) the value of the timer Tm to "0".

Step 950: The CPU sets (clears) the value of the unsatisfaction flag Xfusei to "0".

Step 960: The CPU sets (clears) the value of the erroneous depression flag XPCSgofumi to "0".

As a result, the value of the erroneous depression flag XPCSgofumi remains to be "1" within the period (erroneous operation consideration period) from the time point at which the value of the unsatisfaction flag Xfusei is set to "1" (namely, the time point at which the erroneous operation condition is no longer satisfied) until elapse of the consideration period Tminashi. Thus, even when the accelerator pedal operation amount AP is equal to or larger than the PCS automatic braking stop threshold value APpcsth within this period ("Yes" in Step 440 of FIG. 4 and "Yes" in Step 520 of FIG. 5), the value of the erroneous depression flag XPCSgofumi is "1", and thus the value of the PCS automatic braking prohibition flag XPCSkinshi is not set to "1". As a result, even when the accelerator pedal operation amount AP becomes equal to or larger than the PCS automatic braking stop threshold value APpcsth within this period, the PCS automatic braking operation is not stopped and continued.

On the contrary, when the unsatisfaction flag Xfusei is not "1" at the time of execution of the processing of Step 910 by the CPU, the CPU determines "No" in Step 910, and directly proceeds to Step 995.

As described above, the first device does not stop and continues the PCS automatic braking even when the accelerator pedal operation amount AP becomes equal to or larger than the automatic braking stop threshold value APpcsth not only within the erroneous operation determination period but also within the erroneous operation consideration period (namely, specific period).

Therefore, it is possible to reliably execute the PCS automatic braking even when the driver in a panicked state has accidentally performed an operation that does not satisfy the erroneous operation condition, and after that, has strongly depressed the accelerator pedal 201 within the consideration period Tminashi.

Second Embodiment

Next, a description is given of a driving support apparatus (hereinafter sometimes referred to as "second device") according to a second embodiment of the present invention. The second device starts PCS automatic braking irrespective of the value of the prohibition flag XPCSkinshi when an object having a high collision possibility is a pedestrian. Further, the second device continues the PCS automatic braking during execution of the PCS automatic braking until the vehicle stopped state has continued for the threshold period Tspdth or more irrespective of the value of the prohibition flag XPCSkinshi.

(Specific Operation)

Figure 10:
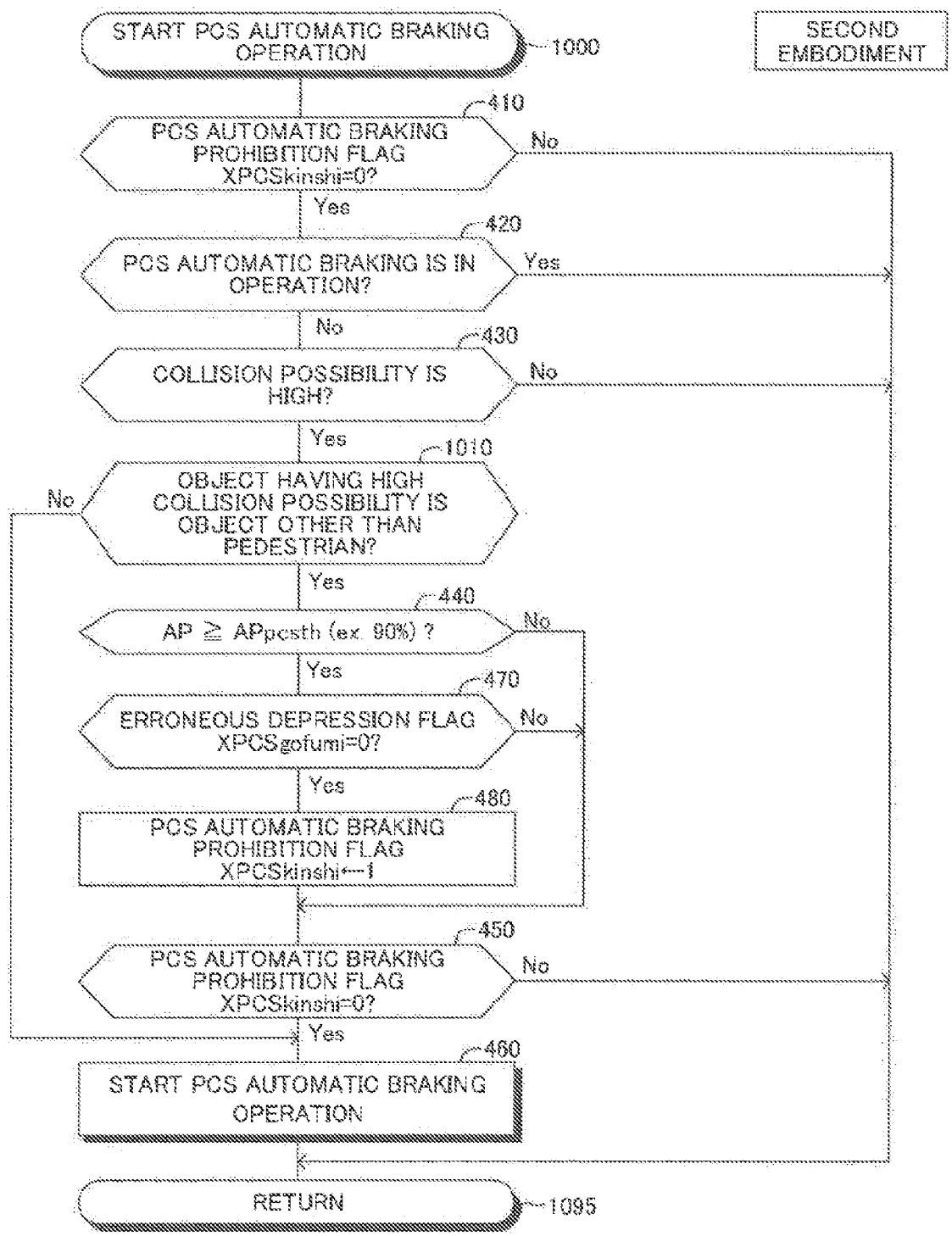
FIG. 10 is a flowchart for illustrating a routine to be executed by a CPU of a driving support ECU included in a driving support apparatus (second device) according to a second embodiment of the present invention.
Figure 11:
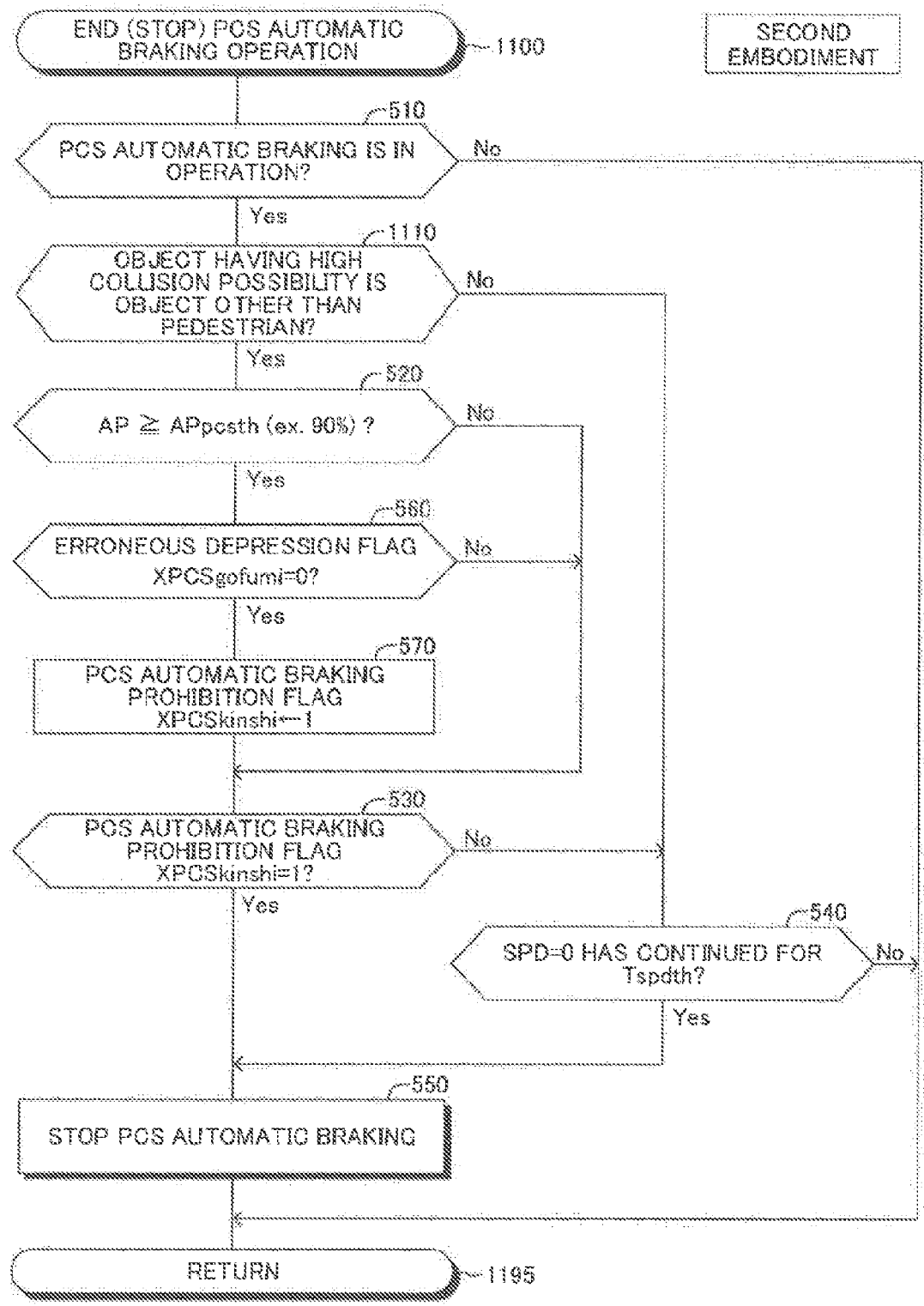
FIG. 11 is a flowchart for illustrating a routine to be executed by the CPU of the driving support ECU included in the second device.

Next, a description is given of a specific operation of the second device. The CPU included in the DSECU 20 of the second device is configured to execute routines illustrated in the flowcharts of "FIG. 10 instead of FIG. 4", "FIG. 11 instead of FIG. 5", and FIG. 6 to FIG. 9 every time a predetermined period of time elapses. Now, a description is given of the "PCS automatic braking operation start routine" illustrated in FIG. 10 and the "PCS automatic braking operation end routine" illustrated in FIG. 11. In FIG. 10 and FIG. 11, "steps for executing the same processing as those of FIG. 4 and FIG. 5" are denoted by reference numerals assigned to corresponding steps of FIG. 4 and FIG. 5, and a description thereof is appropriately omitted.

1. Start of Operation of PCS Automatic Braking

When the value of the prohibition flag XPCSkinshi is "0" and PCS automatic braking is not in operation, the CPU proceeds to Step 430 of FIG. 10 to determine whether or not the vehicle is likely to collide with an object.

When the vehicle is likely to collide with an object, the CPU determines "Yes" in Step 430, and proceeds to Step 1010 to determine whether or not the object having a high collision possibility is an object other than a pedestrian.

More specifically, the CPU extracts an image region corresponding to the object having a high collision possibility in the image acquired by the camera device 22. Then, the CPU compares the extracted image region with a "template image of a pedestrian registered in advance in the driving support ECU 20", to thereby determine whether or not the object is an object other than a pedestrian.

When the object having a high collision possibility is a pedestrian, the CPU determines "No" in Step 1010, and proceeds to Step 460 to start the operation of PCS automatic braking. After that, the CPU proceeds to Step 1095 to temporarily end this routine. On the contrary, when the object having a high collision possibility is not a pedestrian (that is, when the object having a high collision possibility is an "object other than a pedestrian"), the CPU determines "Yes" in Step 1010, and proceeds to the processing of Step 440 and subsequent processing.

In this manner, when the object having a high collision possibility is a pedestrian ("No" in Step 1010), the second device directly proceeds to Step 460 to start the operation of PCS automatic braking. Thus, in a case where the object having a high collision possibility is a pedestrian, the prohibition flag XPCSkinshi is not set to "1" even when the accelerator pedal operation amount AP is equal to or larger than the PCS automatic braking stop threshold value APpcsth and the erroneous depression flag XPCSgofumi is "0". Further, in this case, determination of Step 450 is also not executed, and thus when the object having a high collision possibility is a pedestrian, the operation of PCS automatic braking is always started.

2. End (Stop) of PCS Automatic Braking

When the CPU proceeds to Step 1110 of FIG. 11 during the operation of PCS automatic braking, the CPU determines whether or not the object (the object determined to have a high collision possibility in Step 430 of FIG. 10) having caused start of PCS automatic braking is an object other than a pedestrian.

When the object is a pedestrian, the CPU determines "No" in Step 1110, and directly proceeds to Step 540 to determine whether or not the state in which PCS automatic braking is in operation and the vehicle speed SPD is "0" (namely, vehicle stopped state) has continued for the threshold period Tspdth or more. When the state in which PCS automatic braking is in operation and the vehicle stopped state is effective has continued for the threshold period Tspdth or more, the CPU determines "Yes" in Step 540, and proceeds to Step 550 to stop the PCS automatic braking. After that, the CPU proceeds to Step 1195 to temporarily end this routine.

On the contrary, when "the state in which PCS automatic braking is in operation and the vehicle stopped state is effective" has not continued for the threshold period Tspdth or more, the CPU determines "No" in Step 540, and directly proceeds to Step 1195 to temporarily end this routine. As a result, the PCS automatic braking is continued.

On the contrary, when the object having a high collision possibility is not a pedestrian at the time of execution of the processing of Step 1110 by the CPU (that is, when the object having a high collision possibility is an "object other than a pedestrian"), the CPU determines "Yes" in Step 1110, and proceeds to the processing of Step 520 and subsequent processing.

In this manner, when the object having caused start of the PCS automatic braking is a pedestrian ("NO" in Step 1110), the second device directly proceeds to Step 540. Thus, in a case where the object is a pedestrian, the prohibition flag XPCSkinshi is not set to "1" even when the accelerator pedal operation amount AP is equal to or larger than the PCS automatic braking stop threshold value APpcsth and the erroneous depression flag XPCSgofumi is "0". Thus, the PCS automatic braking executed when the object having a high collision possibility is a pedestrian is stopped only when the state in which PCS automatic braking is in operation and the vehicle stopped state is effective has continued for the threshold period Tspdth or more.

As described above, when the object having a high collision possibility is a pedestrian, the second device executes PCS automatic braking irrespective of the value of the PCS automatic braking prohibition flag XPCSkinshi. When the vehicle is likely to collide with a pedestrian, the driver is unlikely to operate the accelerator pedal 201 so that the accelerator pedal operation amount AP becomes equal to or larger than the PCS automatic braking stop threshold value APpcsth. When the driver is performing such an operation, the operation is considered to be an unintentional operation by the driver, namely, an erroneous operation. Thus, in a case where the object having a high collision possibility is a pedestrian, the second device always executes PCS automatic braking even when the accelerator pedal operation amount AP is equal to or larger than the PCS automatic braking stop threshold value APpcsth and the erroneous operation state is not effective.

When the object having a high collision possibility is a combination of any one of the following objects, the second device may always execute PCS automatic braking irrespective of the value of the PCS automatic braking stop threshold value APpcsth. A bicycle and a motorcycle may be hereinafter simply referred to as "two-wheeled vehicle".

Pedestrian

Bicycle

Motorcycle (motorbike)

Further, when "No" is determined in Step 1010 of FIG. 10, the CPU of the second device may proceed to Step 450. In this case, the processing of Step 440, Step 470, and Step 480 is not executed. As a result, the prohibition flag XPCSkinshi remains to be set to "0" without being set to "1" even when the accelerator pedal operation amount AP is equal to or larger than the PCS automatic braking stop threshold value APpcsth and the erroneous depression flag XPCSgofumi is "0". Thus, "Yes" is always determined in Step 450, and the operation of PCS automatic braking is started.

Similarly, when "No" is determined in Step 1110 of FIG. 11, the CPU of the second device may proceed to Step 530. In this case, the processing of Step 520, Step 560, and Step 570 is not executed. As a result, the prohibition flag XPCSkinshi remains to be set to "0" without being set to "1" even when the accelerator pedal operation amount AP is equal to or larger than the PCS automatic braking stop threshold value APpcsth and the erroneous depression flag XPCSgofumi is "0". Thus, "No" is always determined in Step 530, and the CPU proceeds to Step 540.

Further, the CPU of the second device may execute the determination of Step 1010 of FIG. 10 immediately before the determination of Step 450. That is, the CPU may proceed to Step 1010 after the execution of the processing of Step 480 or when "No" is determined in Step 440. When the CPU determines "Yes" in Step 1010 (that is, when the object having a high collision possibility is not a pedestrian), the CPU proceeds to Step 450. On the contrary, when the CPU determines "No" in Step 1010 (that is, when the object having a high collision possibility is a pedestrian), the CPU directly proceeds to Step 460 without executing Step 450, and starts the operation of PCS automatic braking. When the accelerator pedal operation amount AP is equal to or larger than the PCS automatic braking stop threshold value APpcsth and the erroneous depression flag XPCSgofumi is "0", the prohibition flag XPCSkinshi is set to "1" in Step 480. However, when the object having a high collision possibility is a pedestrian, the CPU directly proceeds to Step 460 without executing the determination of Step 450. Thus, the operation of PCS automatic braking is always started irrespective of the value of the prohibition flag XPCSkinshi.

Similarly, the CPU of the second device may execute the determination of Step 1110 of FIG. 11 immediately before the determination of Step 530. That is, the CPU may proceed to Step 1110 after the execution of the processing of Step 570 or when "No" is determined in Step 520. When the CPU determines "Yes" in Step 1110 (that is, when the object having a high collision possibility is not a pedestrian), the CPU proceeds to Step 530. On the contrary, when the CPU determines "No" in Step 1110 (that is, when the object having a high collision possibility is a pedestrian), the CPU directly proceeds to Step 530 without executing Step 540. When the accelerator pedal operation amount AP is equal to or larger than the PCS automatic braking stop threshold value APpcsth and the erroneous depression flag XPCSgofumi is "0", the prohibition flag XPCSkinshi is set to "1" in Step 570. However, when the object having a high collision possibility is a pedestrian, the CPU proceeds to Step 540 without executing the determination of Step 530, and thus the operation of PCS automatic braking continues until the state in which the PCS automatic braking is in operation and the vehicle stopped state is effective has continued for the threshold period Tspdth or more irrespective of the value of the prohibition flag XPCSkinshi.

The present invention is not limited to the above-mentioned embodiments, and various modification examples can be adopted within the scope of the present invention. The first device may not include the camera device 22.

Further, the first device and the second device may execute warning control for notifying the driver of the fact that there is an object having a high collision possibility instead of executing PCS automatic braking. In the warning control, the first device and the second device display, on the display device of the notification device 50, a notification to the effect that there is an object having a high collision possibility, and issue a predetermined warning sound from the sound emitting device of the notification device 50.

The first device and the second device execute warning control until there is no object having a high collision possibility. More specifically, in Step 540 of FIG. 5, the CPU of the DSECU 20 of the first device determines whether or not there is an object having a high collision possibility. When there is an object having a high collision possibility, the CPU determines "No" in Step 540, and proceeds to Step 595 to temporarily end this routine. On the contrary, when there is an object having a high collision possibility, the CPU determines "Yes" in Step 540, and proceeds to Step 550 to stop warning control. The same processing is executed by the second device in Step 540 of the routine of FIG. 11.

The erroneous operation determination condition may be any one of the above-mentioned first erroneous operation determination condition and second erroneous operation determination condition.

Further, the erroneous operation determination condition may be a condition other than the above-mentioned first erroneous operation determination condition and second erroneous operation determination condition. For example, the CPU may determine that the erroneous operation determination condition is satisfied when both of Condition a and Condition b given below are satisfied.

Condition a: The first erroneous operation condition is satisfied.

Condition b: The amount of increase (increase speed of accelerator pedal operation amount) per unit time of the accelerator pedal operation amount AP is equal to or larger than a threshold increase amount (threshold increase speed).

In the above description, the terms and/or reference symbols used in embodiments of the present invention described later are enclosed in parentheses and assigned to the components of the present invention corresponding to the embodiments for easier understanding of the present invention. However, the constituent elements of the present invention are not limited to the embodiments defined by the terms and/or reference symbols.

What is claimed is:

1. A driving support apparatus, comprising:
an object detector, including a radar and a camera, configured to detect an object present in front of a vehicle; and
at least one electronic control unit (ECU) including a processor programmed to:
determine whether a predetermined collision condition is satisfied based on the object being detected;
execute automatic collision prevention control for avoiding collision with the detected object when the predetermined collision condition is satisfied;
during the collision prevention control, determine whether a pedal depression amount of an accelerator pedal pressed by a driver of the vehicle is equal to or larger than a predetermined stop threshold value;
based upon a determination that the pedal depression amount is equal to or larger than the predetermined stop threshold value, determine whether the pedal depression amount occurs within a specific period having a start point and an end point, the start point being a time point of determination that a predetermined erroneous operation condition relating to the pedal depression amount is satisfied, the predetermined erroneous operation condition being satisfied when a driver of the vehicle is likely to erroneously operate the accelerator operator, the end point being a time point of determination that a predetermined consideration period has elapsed since the predetermined erroneous operation condition has no longer been satisfied; and
stop executing the collision prevention control when the pedal depression amount of the accelerator pedal that is equal to or larger than the predetermined stop threshold value does not occur within the specific period, and
continue to execute the collision prevention control when the pedal depression amount of the accelerator pedal that is equal to or larger than the predetermined stop threshold value occurs within the specific period.

2. The driving support apparatus according to claim 1, wherein the at least one ECU is further programmed to determine satisfaction of the predetermined erroneous operation condition when the pedal depression amount is larger than a first predetermined amount and a pedal depression amount of a brake pedal pressed by the driver is larger than a second predetermined amount.

3. The driving support apparatus according to claim 1, wherein the at least one ECU is further programmed to determine satisfaction of the predetermined erroneous operation condition when a reoperation condition is satisfied, the reoperation condition being satisfied when a history of the pedal depression amount in a predetermined period immediately before a current time point indicates a reoperation state, in which the driver has performed an increase operation of increasing the pedal depression amount after performing a decrease operation of decreasing the pedal depression amount.

4. The driving support apparatus according to claim 3, wherein the at least one ECU is further programmed to determine satisfaction of the reoperation condition when the pedal depression amount has decreased from a third predetermined amount or more to a fourth predetermined amount or less within the predetermined period.

5. The driving support apparatus according to claim 1, wherein the at least one ECU is further programmed to execute the collision prevention control even when the pedal depression amount is equal to or larger than the predetermined stop threshold value in a case where the detected object satisfying the predetermined collision condition is a pedestrian.

6. The driving support apparatus according to claim 1, wherein the at least one ECU is further programmed to execute the collision prevention control even when the pedal depression amount is equal to or larger than the predetermined stop threshold value in a case where the detected object satisfying the predetermined collision condition is a two-wheeled vehicle including a bicycle and a motorcycle.

7. The driving support apparatus according to claim 1, wherein the collision prevention control includes automatic braking control.

* * * * *